United States Patent [19]
Mori et al.

[11] 3,812,739
[45] May 28, 1974

[54] GEAR TRAIN ARRANGEMENTS

[75] Inventors: Yoichi Mori, Yokohama; Nobuo Okazaki, Chigasaki; Kunio Ohtsuka; Tetsuya Iijima, both of Tokyo, all of Japan

[73] Assignee: Nissan Motor Company Limited, Yokohama City, Japan

[22] Filed: Sept. 13, 1972

[21] Appl. No.: 288,550

Related U.S. Application Data
[62] Division of Ser. No. 30,496, April 21, 1970, Pat. No. 3,701,293.

[30] Foreign Application Priority Data
June 4, 1969 Japan.............................. 44-43274

[52] U.S. Cl. ............................................. 74/763
[51] Int. Cl. ........................................... F16h 57/10
[58] Field of Search ...................................... 74/763

[56] References Cited
UNITED STATES PATENTS
3,035,457  5/1962  Cartwright........................ 74/763 X
3,339,431  9/1967  Groswhite et al................. 74/763 X

*Primary Examiner*—Arthur T. McKeon

[57] ABSTRACT

Gear train arrangements for transmitting a power from a driving source to a driven member at more than three speeds in one direction and another speed in the opposite direction, the gear train arrangements using basically three planetary gear sets and at least five friction elements such as clutches and brakes which are selectively actuated to selectively engage the rotary members of the three planetary gear sets to deliver an output power at the above said speeds. The gear train arrangements are specifically adapted for use in an automatic transmission system of a motor vehicle using a torque converter or fluid coupling.

1 Claim, 37 Drawing Figures

Fig. 9
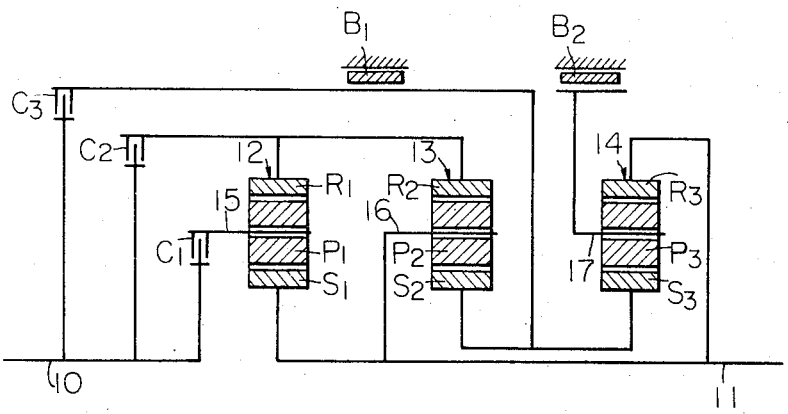
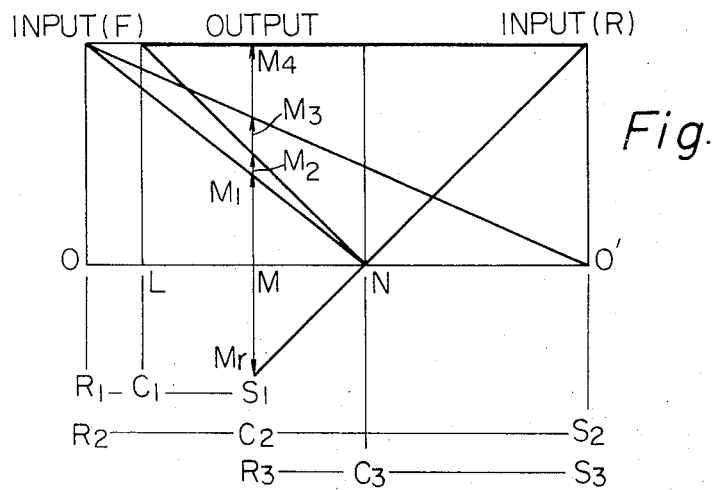
Fig. 9a
Fig. 9b
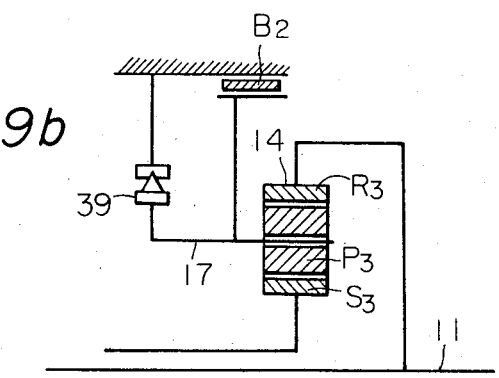

GEAR TRAIN ARRANGEMENTS

This is a division, of U.S. application Ser. No. 30,496 now U.S. Pat. No. 3,701,293 filed Apr. 21, 1970.

This invention relates to gear train arrangements for a transmission system of a motor vehicle and, more particularly, to gear train arrangements of planetary gear type adapted to provide basically four forward and one reverse vehicle speeds.

A usual gear train arrangement using a planetary gear system is made up of a combination of one or more, similar or different, planetary gear sets each having one or more planet pinions and is operated through actuation of friction elements such as clutches and brakes which are arranged to attain a desired combination of gear ratios. Typical of such gear train arrangement is the one that uses three simple planetary gear sets which are combined together to provide three forward and one reverse vehicle speeds. (It may be noted that the term "simple" planetary gear set as herein used is intended to refer to a planetary gear set having a single planet pinion.)

Foremost of the practical requirements of a gear train arrangement to attain an increased number of vehicle speeds is a wide selection of the combinations of gear ratios, which requirement, however, is reflected by an increased number of component parts of the gear train arrangement and complicated gear shifting operations.

In order that the gear train be snugly accommodated within a limited space in the transmission system, every component of the planetary gear system should be as small in dimensions as possible. From the view point of production economy, moreover, it is desired that the number of the component parts of the gear train be reduced to a minimum and that the parts corresponding in function be fabricated to be common in geometry to one another so as to permit of quantity production. Another important requirement of the gear train of a transmission system is the ease of gear shifting operations.

It is, therefore, an object of the invention to provide gear train arrangements adapted to provide basically four forward and one reverse vehicle speeds.

Another object is to provide gear train arrangements providing essentially four forward and one reverse vehicle speeds with wide selection of the combinations of gear ratios.

Still another object is to provide gear train arrangements providing four, or even more, forward and one reverse vehicle speeds, which arrnagements are constructed with a practically minimum number of component parts and nevertheless can provide practically any desired combination of gear ratios.

Still another object is to provide gear train arrangements that are suited for quantity production.

Still another object is to provide gear train arrangements providing four, or even more, forward and one reverse vehicle speeds with utmost ease of gear shifting operations.

In order to achieve these and other objects, the invention proposes to use various combinations of basically three substantially identically sized planetary gear sets which are operated by means of two or three clutches and two or three brakes. The gear train arrangements using such combinations can be readily modified with incorporation of additional minor arrangements into those providing five or six forward and one reverse vehicle speeds.

In the drawings:

FIG. 9 is similar to FIGS. 1 to 8 but shows other embodiments using three planetary gear sets with three clutches and two brakes to provide four forward and one reverse vehicle speeds;

Figure 10:
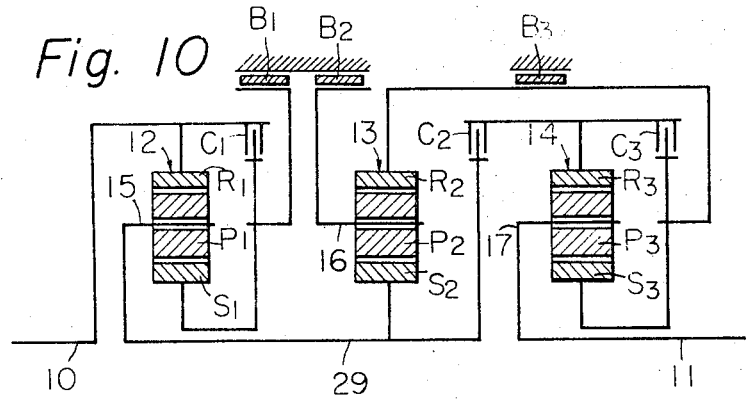
Figure 11:
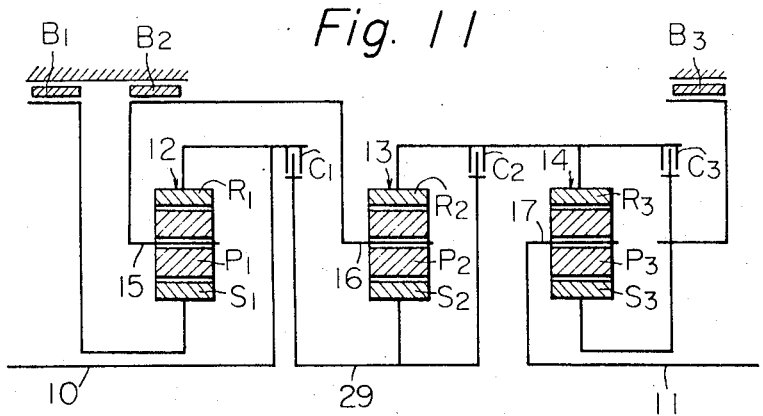
Figure 12:
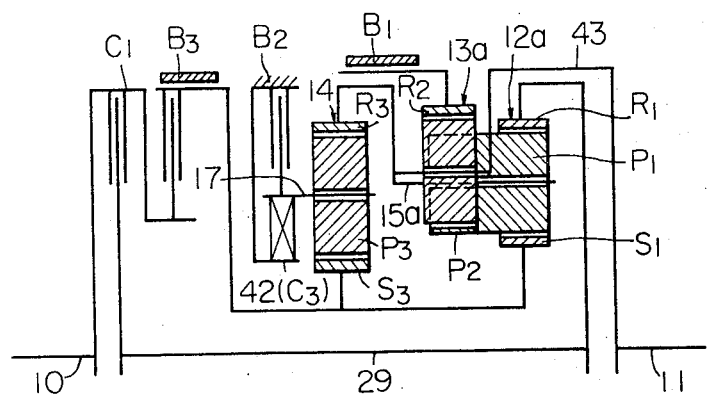
Figure 13:
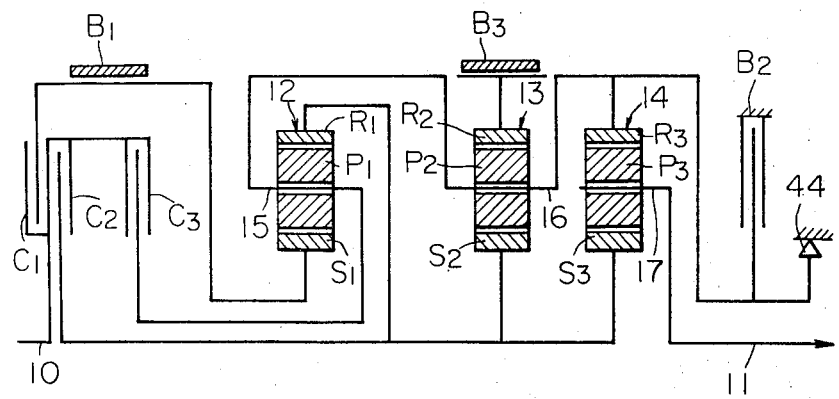
Figure 14:
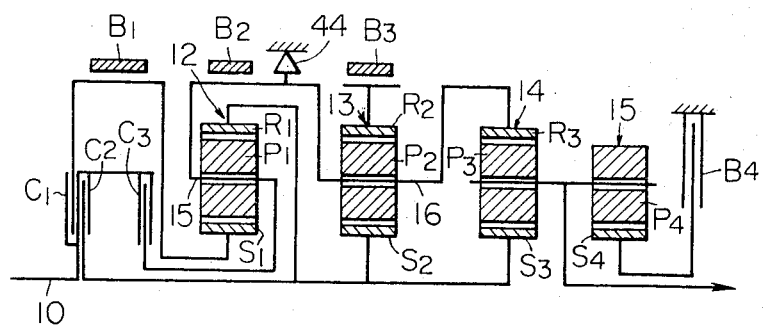
Figure 15:
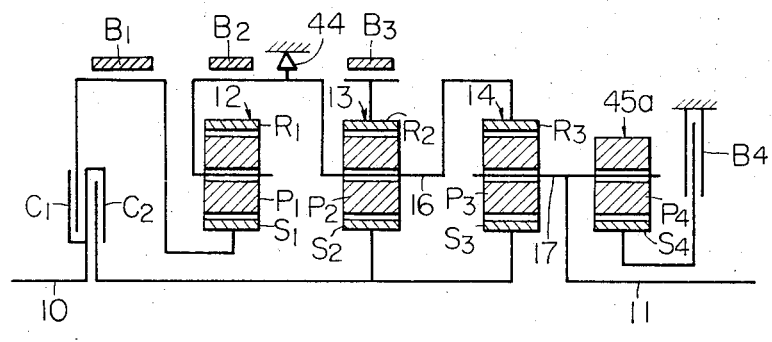
Figure 16:
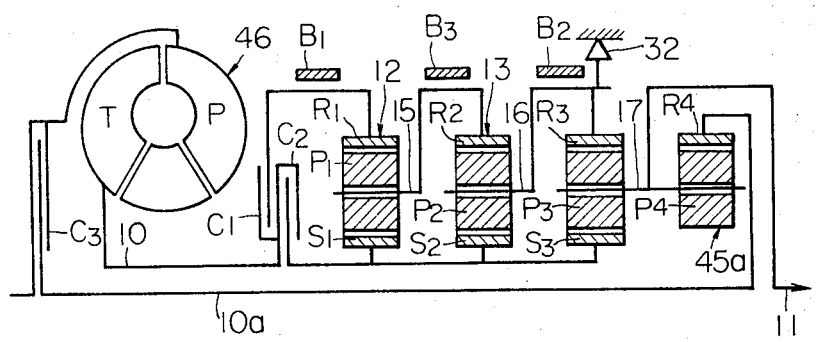
Figure 17:
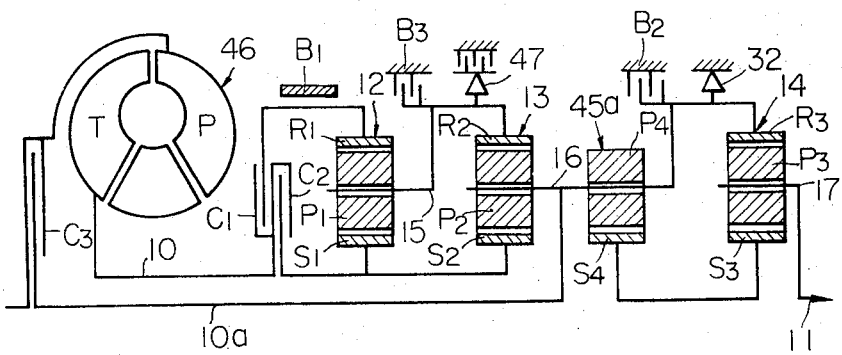

FIGS. 10, 11, and 12 are views illustrating still other embodiments using three planetary gear sets with three clutches and three brakes to provide four forward and one reverse vehicle speeds;

FIG. 13 is a view illustrating still another embodiment using four (including one auxiliary) planetary gear sets with three clutches and four brakes to provide four forward and one reverse vehicle speeds;

FIG. 14 is a view illustrating still another embodiment using three planetary gear sets with three clutches and three brakes to provide five forward and one reverse vehicle speeds;

FIG. 15 is a view illustrating still another embodiment using four (including one auxiliary) planetary gear sets with two clutches and three brakes to provide five forward and one reverse vehicle speeds;

FIG. 16 is a view illustrating still another embodiment using four (including one auxiliary) planetary gear sets with three clutches and four brakes to provide six forward and one reverse vehicle speeds;

FIG. 17 is a view illustrating still another embodiment using four planetary gear sets with three clutches and five brakes to provide an overdrive from the fourth speed.

FIGS. 1a to 16a are diagrams each showing the different revolution speeds of the individual rotary members of the planetary gear sets used in the embodiment illustrated in the corresponding figure out of FIGS. 1 to 16; and FIGS. 1b, 4b, 6b, 7b, 8b, 9b and 10b are views each showing a modification of the embodiment illustrated in the corresponding figure without the subscript.

Corresponding reference numerals and characters represent like members in all the figures.

It may be noted in regard to the drawings that only the upper half of each gear train arrangement is herein shown for simplicity of illustration because the gear train arrangement is generally symmetrical with respect to the input and output shafts.

Figure 1:
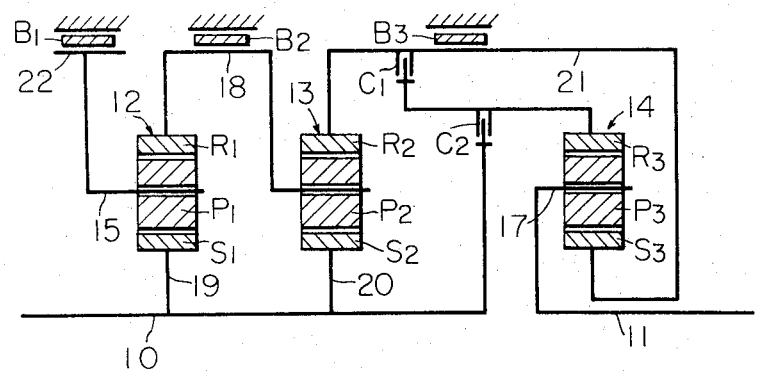
FIGS. 1 to 8 are sectional views schematically showing various preferred embodiments of the invention, each of which embodiments uses three planetary gear sets with two clutches and three brakes to provide four forward and one reverse vehicle speeds.

First referring to FIG. 1, the gear train according to one embodiment of the invention is, as customary, connected at one end with an engine through an input shaft 10 and a torque converter or fluid coupling (not shown) and at the other end with a differential (not shown) through an output shaft 11 of the transmission system.

The gear train as shown includes a first, second and third planetary gear sets 12, 13 and 14, all of which are constructed as simple planetary gear sets which are fabricated to be substantially identical in geometry with each other.

The first planetary gear set 12 comprises an outer ring gear $R_1$, a planet pinion $P_1$ meshing with the outer ring gear, and a sun gear $S_1$ meshing with the planet pinion. The second planetary gear set 13 similarly comprises an outer ring gear $R_2$, a planet pinion $P_2$ meshing with the ring gear, and a sun gear $S_2$ meshing with the planet pinion. The third planetary gear set 14 also similarly comprises an outer ring gear $R_3$, a planet pinion $P_3$ meshing with the ring gear, and a sun gear $S_3$ meshing with the planet pinion. The planet pinions $P_1$, $P_2$ and $P_3$ are carried on and revolved by pinion carriers 15, 16 and 17, respectively. The ring gears, pinion carriers and sun gears are all rotatable about a common axis which is in line with the axes of the pinion carriers. More detailed discussion on the constructions and motions of the planetary gear set per se is herein omitted because they are well known in the art.

The ring gear $R_1$ of the first planetary gear set 12 is constantly connected to and rotatable with the planet pinion $P_2$ of the second planetary gear set 13 through the pinion carrier which forms part of a drum 18. The sun gears $S_1$ and $S_2$ of the first and second planetary gear sets 12 and 13, respectively, are constantly connected to and rotatable with the input shaft 10 of the transmission through mechanical linkages 19 and 20, respectively. The ring gear $R_2$ is constantly connected to and rotatable with the sun gear $S_3$ of the third planetary gear set 14 through a drum 21. The pinion carrier 17 is constantly connected to and rotatable with the output shaft 11 of the transmission to carry an output power to the differential (not shown).

The pinion carrier 15 of the planet pinion $P_1$ is connected to a first band brake $B_1$ which, when applied, holds the planet pinion $P_1$ stationary. The drum 18 interconnecting the ring gear $R_1$ and planet pinion $P_2$ coacts with a second band brake $B_2$ which, when applied, holds both the ring gear $R_1$ and planet pinion $P_2$ stationary. The drum 21 interconnecting the ring gear $R_2$ and sun gear $S_3$ coacts with a third band brake $B_3$ which, when applied, holds both the ring gear $R_2$ and sun gear $S_3$ stationary.

Two clutches $C_1$ and $C_2$ are provided to selectively connect the ring gear $R_3$ to the drum 21 and the input shaft 10, respectively.

Now, it is well known in the art that, assuming the revolution speeds of a ring gear, sun gear and pinion carrier of a given planetary gear set are $Nr$, $Ns$ and $Np$, respectively, and the ratio of the number of teeth of the sun gear to the number of teeth of the ring gear is $\alpha$, then the following equation holds:

$$(\alpha + 1) \cdot Np = Nr + \alpha \cdot Ns.$$

Thus, for the planetary gear sets 12, 13 and 14, the following equations can be derived:

$$(\alpha_1 + 1) \cdot Np_1 = Nr_1 + \alpha_1 \cdot Ns_1,$$

$$(\alpha_2 + 1) \cdot Np_2 = Nr_2 + \alpha_2 \cdot Ns_2,$$

and $$(\alpha_3 + 1) \cdot Np_3 = Nr_3 + \alpha_3 \cdot Ns_3,$$

where the subscripts 1, 2 and 3 represent the first, second and third planetary gear sets 12, 13 and 14, respectively.

In consideration of the constant connections between some of the rotary members of the planetary gear sets, the following equations hold:

$$Ns_1 = Ns_2,$$

$$Nr_1 = Np_2,$$

and $$Nr_2 = Ns_3$$

The speeds $Ns_1$ and $Np_3$ are equal to the revolution speeds of the input and output shafts 10 and 11, respectively.

Figure 1A:
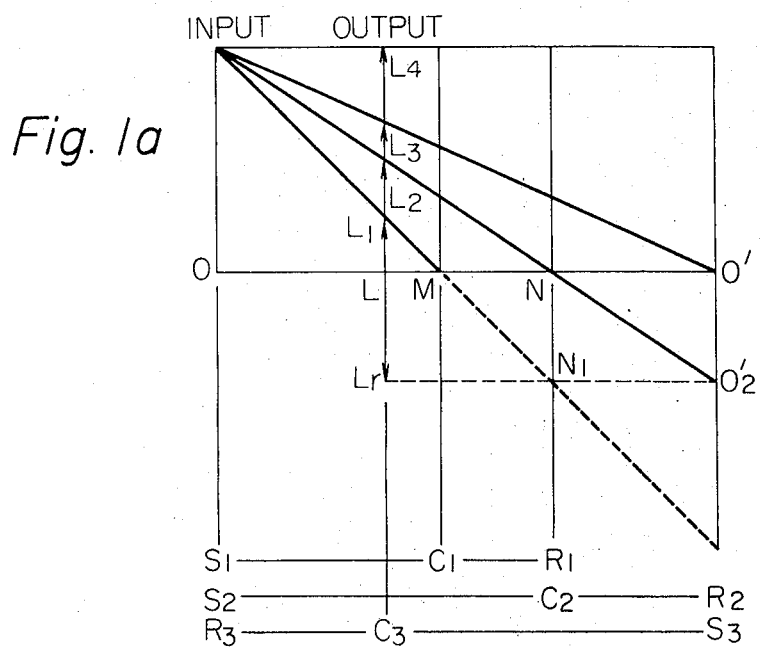

These mathematical relations between the revolution speeds of the individual rotary members of the planetary gear sets can be graphically illustrated in FIG. 1a, wherein points L, M and N are given on a line O–O' in such a manner that the following relations are maintained:

$$OL/LM = \alpha_1,$$

$$ON/NO' = \alpha_2,$$

and $$O'L/LO = \alpha_3$$

Thus, the points O, L, M, N and O' stand for the relations between those individual rotary members of the planetary gear sets which are respectively shown below these points. The speed vector of each rotary member of the planetary gear sets is indicated by a length from the respective point O, L, M, N or O' on a line extending therefrom.

When, in operation, the first speed is to be selected, the second clutch $C_2$ is coupled and the first brake $B_1$ applied. The ring gear $R_3$ of the third planetary gear set 14 now rotates with the input shaft 10 and the planet carrier 15 is held stationary, so that the following equations hold:

$$Ns_2 = Nr_3$$

and $$Np_1 = O$$

In this condition, the sun gear $S_1$ is rotated directly by the input shaft 10 with the planet gear $P_1$ held stationary so that the ring gear $R_1$ and the pinion carrier 16 of the planet pinion $P_2$ rotate at a speed corresponding to a vector $NN_1$ in FIG. 1a. With the sun gear $S_2$ rotating with the input shaft 10, the ring gear $R_2$ and the sun gear $S_3$ rotate at a speed corresponding to a vector $OO_1$. The ring gear $R_3$ rotating with the input shaft and the sun gear $S_3$ rotating at a speed corresponding to $O'O$, the pinion carrier 17 of the planet pinion $P_3$ rotates at speed corresponding to $AA_1$ providing a gear ratio for the first forward vehicle speed.

The gear ratio establishng the first speed thus delivered from the output shaft 11 is thus expressed as:

$$Ns_1/Nc_3 = [1 + \alpha_3/1 - \alpha_2 \cdot \alpha_3 - \alpha_1 \cdot \alpha_3(1 + \alpha_2)]$$

When the vehicle speed is to be shifted from the first to the second speed, then the first brake $B_1$ is released and instead the second brake $B_2$ is applied with the second clutch $C_2$ kept coupled. Thus:

$$Nr_1 = Np_2 = O$$

With the brake $B_2$ applied, the planet pinion $P_2$ is held stationary and the sun gear $S_3$ rotates with the input shaft 10 so that the ring gear $R_2$ and the sun gear $S_3$ are rotated at a speed corresponding to a vector $O'O_2$ in FIG. 1a. With the clutch $C_2$ coupled, the ring gear $S_3$ rotates with the input shaft 10 so that the pinion carrier 17 of the planet pinion $P_3$ rotates at a speed corresponding to a vector $AA_2$ providing a gear ratio for the second forward speed.

The gear ratio for the second vehicle speed is thus expressed as:

$$Ns_1/Np_3 = (1 + \alpha_3/1 - \alpha_2 \cdot \alpha_3)$$

When the speed is to be shifted from the second to the third speed, the second brake $B_2$ is released and instead the third brake $B_3$ applied with the second clutch $C_2$ kept coupled. Thus:

$$Nr_2 = Ns_3 = O$$

and $$Nr_3 = Ns_2$$

With the brake $B_3$ applied and the clutch $C_2$ coupled, the sun gear $S_3$ is held stationary and the ring gear $R_3$ rotates with the input shaft 10 so that the pinion carrier 17 of the planet pinion $P_3$ rotates at a speed corresponding to a vector $AA_3$ which provides a gear ratio to establish the third forward speed.

speed of the ring gear $R_2$ and sun gear $S_3$. Both the ring gear $R_2$ and sun gear $S_3$ rotating at the speed corresponding to $O_{O2}$, the planetary gear set 14 rotates in its entirety at this speed. The output shaft 11 is thus rotated at a speed corresponding to $O'O_2$ in a direction opposite to the rotation of the input shaft 10.

The gear ratio for the reverse speed thus established is thus expressed as:

$$Ns_1/Np_3 = - 1/\alpha_2$$

The conditions of the clutches and brakes for the different vehicle speeds and the gear ratios attained under these conditions are tabulated in Table I, wherein the sign "+" refers to that the related clutch or brake is actuated and the sign "−" refers to that the clutch or brake is kept released. The gear ratios indicated in the parentheses are derived on the assumption that $\alpha_1 = \alpha_2 = \alpha_3 = 0.45$. (This will apply to all the tables which are hereinafter presented.)

TABLE I

| | $C_1$ | $C_2$ | $B_1$ | $B_2$ | $B_3$ | Gear Ratios | |
|---|---|---|---|---|---|---|---|
| Forward: | | | | | | | |
| 1st | − | + | + | − | − | $\dfrac{1+\alpha_3}{1-\alpha_2 \cdot \alpha_3 - \alpha_1 \cdot \alpha_3(1+\alpha_2)}$ | (2.88) |
| 2nd | − | + | − | + | − | $\dfrac{1+\alpha_3}{1-\alpha_2 \cdot \alpha_3}$ | (1.82) |
| 3rd | − | + | − | − | + | $1 + \alpha_3$ | (1.45) |
| 4th | + | + | − | − | − | 1 | (1.00) |
| Rev | + | − | − | + | − | $-\dfrac{1}{\alpha_2}$ | (−2.22) |

The gear ratio for the third speed is thus expressed as:

$$Ns_1/Nc_3 = 1 + \alpha_3$$

When the speed is to be shifted from the third to the fourth speed, then the third speed $B_3$ is released and the first clutch $C_1$ coupled with the second clutch $C_2$ kept coupled. Thus:

$$Nr_2 = Nr_3 = Ns_2$$

With the brakes $B_1$, $B_2$ and $B_3$ released and the clutches $C_1$ and $C_2$ coupled, all the planetary gear sets rotate with the input shaft so that the revolution speed of the pinion carrier 17 of the planet pinion $P_3$ is equal to the speed of the input shaft, as indicated by a vector $AA_4$ in FIG. 1a.

The gear ratio for the fourth speed attained in this manner is thus expressed as:

$$Ns_1/Np_3 = 1$$

When the vehicle is to be moved backwardly, the first clutch $C_1$ is coupled and the second brake $B_2$ applied. Thus:

$$Nr_2 = Nr_3$$

and $$Nr_1 = Np_2 = O$$

With the brake $B_2$ applied and the sun gear $S_2$ rotating with the input shaft 10, the ring gear $R_2$ and the sun gear $S_3$ rotate at a speed corresponding to a vector $O'O_2$. Since, in this instance, the clutch $C_1$ is coupled, the ring gear $R_3$ also rotates at a speed equal to the In order to streamline the shifting between the first and second speeds, a one-way clutch 23 may be provided on the planet carrier 15 of the first planetary gear set 12, as illustrated in FIG. 1b, if desired.

Figure 1B:
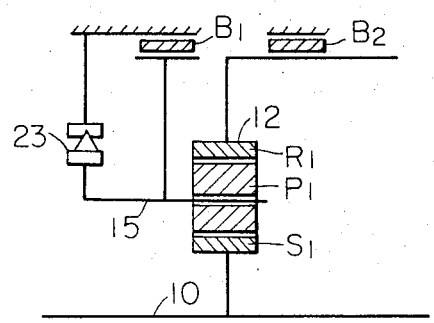

It will be appreciated that the gear train shown in FIGS. 1 and 1b are suited to provide ease of gear shifting operations because the gear ratios can be changed merely by releasing only one of the clutches and brakes and actuating another one of them.

Figure 2:
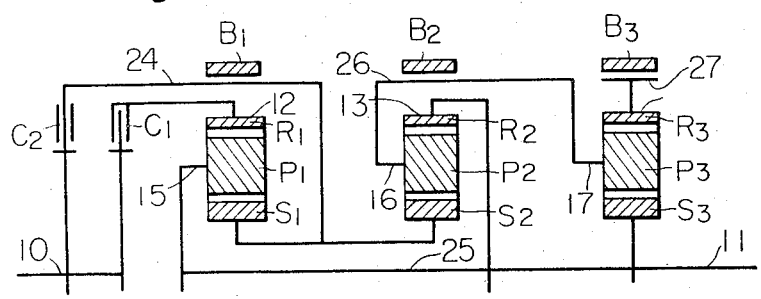

FIG. 2 illustrates another form of the gear train according to the invention. The gear train is constructed essentially similarly to the gear train of FIG. 1 so as to provide four forward and one reverse speeds with use of three identical planetary gears sets 12, 13 and 14 which are operated by two clutches $C_1$ and $C_2$ and three band brakes $B_1$, $B_2$ and $B_3$.

The first clutch $C_1$ is linked on the one hand with the input shaft 10 of the transmission and on the other with the ring gear $R_1$ of the first planetary gear set 12. The second clutch $C_2$, which is also linked with the input shaft 10, is linked with both the sun gears $S_1$ and $S_2$ of the first and second planetary gear sets and 13, respectively, through a drum 24 for the first band brake $B_1$. The sun gears $S_1$ and $S_2$ are as a result constantly connected together and rotatable with each other. The planet pinion $P_1$ of the first planetary gear set 12 is constantly connected to and rotatable with the ring gear $R_2$ of the second planetarys gear set 13, sun gear $S_3$ of the third planetary gear set 14, and output shaft 11 of the transmission through the pinion carrier 15 and an intermediate shaft 25. The planet pinion $P_2$ of the second planetary gear set 13 is constantly connected to and rotatable with the planet pinion $P_3$ of the third planetary gear set 14 through the pinion carriers 16 and 17 which form part of a drum 26 for the seond band brake $B_2$. The ring gear $R_3$ of the third planetary gear set 14 is connected to a drum 27 for the third band brake $B_3$.

Figure 2A:
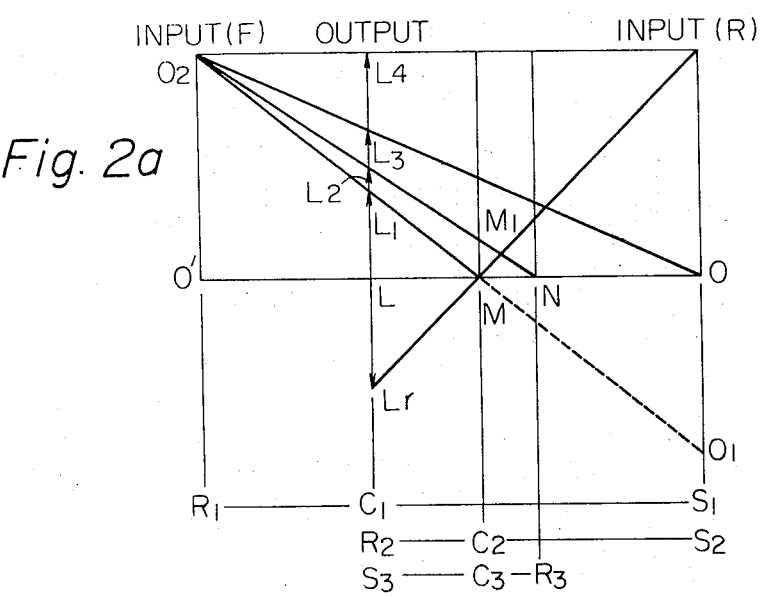

The conditions of the clutches and the brakes for the different vehicle speeds and the gear ratios attained in these conditions are tabulated in Table II; the gear ratios are calculated in a manner similar to that discussed in connection with the gear train of FIG. 1.

ations of the planetary gear sets are exactly converse from those discussed above but, anyway, it is apparent that the second speed corresponds to the vector $AA_2$ in FIG. 2a.

When the speed is shifted from the second to the third speed, the brake $B_1$ in lieu of the brake $B_3$ is now applied with the clutch $C_1$ kept coupled, so that the sun gears $S_1$ and $S_2$ are held stationary and the ring gear $R_1$ rotates with the input shaft 10. The pinion carrier 15 supporting the planet pinion $P_1$, therefore, rotates at a

TABLE II

|  | $C_1$ | $C_2$ | $B_1$ | $B_2$ | $B_3$ | Gear Ratios | |
|---|---|---|---|---|---|---|---|
| Forward: | | | | | | | |
| 1st | + | − | − | + | − | $1 + \alpha_1 + \dfrac{\alpha_1}{\alpha_2}$ | (2.45) |
| 2nd | + | − | − | − | + | $1 + \dfrac{\alpha_1}{\alpha_2} + \dfrac{\alpha_1(\alpha_2 - \alpha_3)}{\alpha_2(1 + \alpha_2)}$ | (1.82) |
| 3rd | + | − | + | − | − | $1 + \alpha_1$ | (1.45) |
| 4th | + | + | − | − | − | $1$ | (1.00) |
| Rev | − | + | − | + | − | $-\dfrac{1}{\alpha_2}$ | (−2.22) |

When the first forward speed is selected, the clutch $C_1$ is coupled and the brake $B_2$ applied. In this instance, the operations of the individual rotary members will be easily understood if it is assumed that the output shaft 11 is first rotated to impart a rotational effort to the input shaft 10, conversely to the actual operation. Thus, if the output shaft 11 is rotated at a speed corresponding to a vector $AA_1$ in FIG. 2a, then the ring gear $R_2$ and the pinion carrier 15 of the planet pinion $P_1$ will rotate at the same speed as the output shaft 11. With the brake $B_2$ applied, the planet pinion $P_2$ is held stationary so that the sun gears $S_2$ and $S_1$ rotate at a speed corresponding to a vector $O'O_1$. Such rotation of the sun gear $S_1$ and the revolution of the planet pinion $P_1$ (which revolves at a speed equal to the revolution speed of the output shaft 11) will dictate the speed at which the ring gear $R_1$ of the first planetary gear set 12 rotates as represented by a vector $OO_2$ in FIG. 2a. The driving force is actually carried to the input shaft 10, not to the output shaft 11, so that the flow of rotation is exactly inverse from that discussed above. Thus, it is apparent that the first speed corresponds with the vector $AA_1$ in FIG. 2a.

When the speed is shifted from the first to the second speed, then the brake $B_2$ is released and the brake $B_3$ is applied with the clutch $C_1$ kept coupled. Here, it is also assumed that the driving force is initially transferred to the output shaft 11. If the output shaft 11 is rotated at a speed corresponding to a vector $AA_2$ in FIG. 2a, the sun gear $S_3$ rotates with the output shaft 11. The ring gear $R_3$ being held stationary with the brake $B_3$ applied, the pinion carriers 17 and 16 rotate at a speed corresponding to a vector $MM'$. Since, in this instance, the ring gear $R_2$ rotates with the output shaft 11 at a speed corresponding to the vector $AA_2$, the sun gears $S_2$ and $S_1$ rotate at a speed corresponding to the vector $O'O_1$. The planet pinion $P_1$ is rotated with the pinion carrier 15 rotating with the output shaft 11 so that the ring gear $R_1$ will rotate at a speed corresponding to the vector $OO_2$ in FIG. 2a. The actual operspeeds corresponding to a vector $AA_3$ providing a gear ratio for the forward speed.

When the speed is further shifted up from the third to the fourth speeds, all the brakes are applied and the clutches are coupled so that the first planetary gear set 12 rotates in the entirety at the same speed as the input shaft 10. The speed of the input shaft 10 is in this manner transferred to the output shaft 11 as it is.

For effecting the reverse movement of the vehicle, the clutch $C_2$ is coupled and the brake $B_2$ applied. The sun gear $S_2$ now rotates with the input shaft 10 with the planet pinion $P_2$ held stationary so that the ring gear $R_2$ rotates at a speed corresponding to a vector $LL_r$ which provides a gear ratio to establish the reverse speed.

It will now be appreciated that the gear train of FIG. 2 is, similarly to that of FIG. 1, adapted to provide ease of gear shifting operations because the gear ratios can be changed merely by releasing only one of the clutches and brakes and actuating another one of them and that, since the output gear can be derived from the intermediate section of the gear train without sacrificing the output torque, the gear train can be utilized in a front-engine, front-driven or rear-engine, rear-driven motor vehicle.

Figure 3:
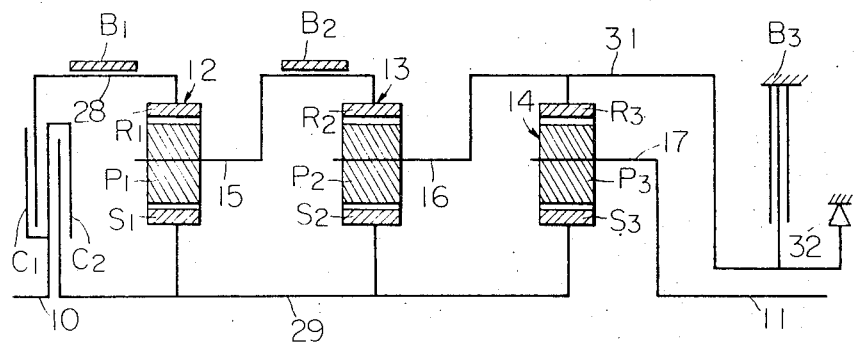

FIG. 3 illustrates still another form of the gear train according to the invention constructed to provide four forward and one reverse speeds. The gear train also has three identical planetary gear sets 12, 13 and 14 with two clutches $C_1$ and $C_2$ and three brakes $B_1$, $B_2$ and $B_3$, as shown.

The first clutch $C_1$ is linked on one side with the input shaft 10 and on the other side with the ring gear $R_1$ of the first planetary gear set 12 through a drum 28 of the first hand brake $B_1$. The second clutch $C_2$ is linked on one side with the input shaft 10 and on the other with the sun gears $S_1$, $S_2$ and $S_3$ of the first, second and third planetary gear sets 12, 13 and 14, respectively, through an intermediate shaft 29. The sun gears $S_1$, $S_2$ and $S_3$ are thus constantly connected to each other and rotatable with the input shaft 10 when the clutch $C_2$ is coupled.

The pinion carrier 15 of the planet pinion $P_1$ of the first planetary gear set 12 is constantly connectd to and rotatable with the ring gear $R_2$ of the second planetary gear set 13 through a drum 30 for the second band brake $B_2$. The pinion carrier 16 of the planet pinion $P_2$ of the second planetary gear set 13 is constantly connected to and rotatable with the ring gear $R_3$ of the third planetary gear set 14 and is linked with the third brake $B_3$ through a drum 31. The pinion carrier 17 of the planet pinion $P_3$ of the third planetary gear set 14 is connected to the output shaft 11. A one-way brake 32 is provided to prevent the planet pinion $P_2$ and sun gear $S_3$ from rotating in a direction opposite to the rotation of the input shaft 10.

In consideration of the constant connections between some of the rotary members of the planetary gear sets in this embodiment, the following relations hold:

$$Np_2 = Nr_3,$$
$$Np_1 = Nr_2,$$

and $$Ns_1 = Ns_2 = Ns_3$$

The conditions of the clutches and brakes for the different vehicle speeds and the gear ratios attained in these conditions are tabulated in Table III.

For shifting the speed from the second to the third speed, the brake $B_1$ is applied with the clutch $C_2$ still coupled. With the ring gear $R_1$ held stationary, the pinion carrier 15 of the planet pinion $P_1$ and the ring gear $R_2$ as well rotate at a speed corresponding to a vector $NN_1$ in FIG. 3a. The pinion carrier 16 of the planet pinion $P_2$ and the ring gear $R_3$ thus rotate at a speed corresponding to a vector $MM_2$ and as a result the pinion carrier 17 of the planet pinion $P_3$ rotates at a speed corresponding to a vector $LL_3$.

To shift the speed from the third to the fourth speed, the two clutches $C_1$ and $C_2$ are coupled with all the brakes released, so that the three planetary gear sets rotate together and the output shaft 11 is rotated at the same speed as the input shaft 10.

For selecting the reverse speed, the clutch $C_1$ is coupled and the brake $B_3$ applied. The ring gear $R_1$ now rotates with the input shaft 10 and, with the pinion carrier 16 of the planet pinion $P_2$ held stationary by the brake $B_3$, the pinion carrier 17 of the planet pinion $P_3$ rotates at a speed corresponding to a vector $LL_r$ in FIG. 3a.

It will be noted that the brake $B_3$, which is required to have a relatively great torque capacity for effecting the reverse rotation of the output shaft 11, is not actuated when the vehicle is driven forward and that, for this reason, the gear ratios for the forward speeds can be shifted smoothly.

TABLE III

| | $C_1$ | $C_2$ | $B_1$ | $B_2$ | $B_3$ | Gear Ratios | |
|---|---|---|---|---|---|---|---|
| Forward: | | | | | | | |
| 1st | − | + | − | − | − | $\dfrac{\alpha_3 + 1}{\alpha_3}$ | (3.22) |
| 2nd | − | + | − | + | − | $\dfrac{\alpha_2 + \alpha_2 \cdot \alpha_3 + \alpha_3 + 1}{\alpha_2 + \alpha_2 \cdot \alpha_3 + \alpha_3}$ | (1.90) |
| 3rd | − | + | + | − | − | $\dfrac{(\alpha_1 + 1)(\alpha_2 + 1)(\alpha_3 + 1)}{\alpha_1 + (\alpha_1 + 1)(\alpha_2 + \alpha_2 \cdot \alpha_3 + \alpha_3)}$ | (1.49) |
| 4th | + | + | − | − | − | 1 | (1.00) |
| Rev | + | − | − | − | + | $\dfrac{(\alpha_3 + 1)(\alpha_1 + \alpha_1 \cdot \alpha_2 + \alpha_2)}{\alpha_3}$ | (3.55) |

Now, for the first forward speed, the clutch $C_2$ is coupled with the brakes $B_1$, $B_2$ and $B_3$ all released. The three planetary gear sets rotate together at the same speed as the input shaft 10. In this instance, the ring gear $R_3$ tends to rotate in a direction opposite to the direction of rotation of the planetary gear sets because of the running resistance of the vehicle as tranferred thereto from the wheel axles. Such tendency is, however, obstructed by the one-way brake 32 so that the relation $Nr_3 = O$ holds. The output speed thus delivered to the output shaft 11 is indicated as a vector $LL_1$ in FIG. 3a.

When the speed is shifted to the second speed, the brake $B_2$ is applied with the clutch $C_2$ coupled. The sun gear $S_2$ being rotated by the input shaft 10 through the clutch $C_2$ and intermediate shaft 29, the pinion carrier 16 of the planet pinion $P_2$ rotates at a speed corresponding to a vector $MM_1$ in FIG. 3a with the ring gear $R_2$ held stationary by the brake $B_2$. The ring gear $R_3$ thus rotates at the same speed as the pinion carrier 16, while the sun gear $S_3$ is rotated at the same speed as the input shaft 10. The result is that the pinion carrier 17 of the planet pinion $P_3$ rotates at a speed corresponding to a vector $LL_2$ providing a gear ratio for the second speed.

Figure 4:
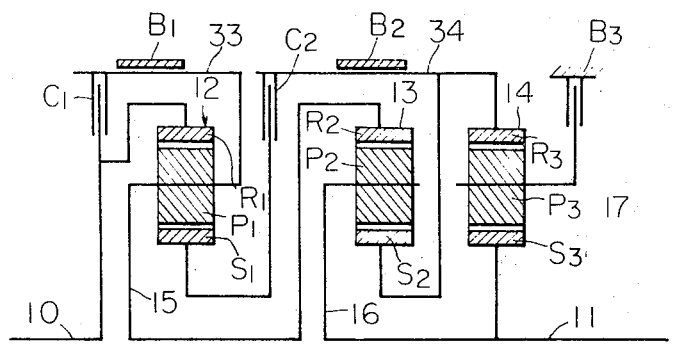

A further modified form of the gear train providing four forward and one reverse speeds with use of three identical planetary gear sets is illustrated in FIG. 4.

As shown the gear train has a first, second and third planetary gear sets 12, 13 and 14, respectively, which are operated by two clutches $C_1$ and $C_2$ and three band brakes $B_1$, $B_2$ and $B_3$.

The input shaft 10 is constantly connected to the ring gear $R_1$ and releasably connected to the pinion carrier 15 of the planet pinion $P_1$ of the first planetary gear set through the first clutch $C_1$ and a drum 33 for the first brake $B_1$. This pinion carrier 15 is constantly connected to and rotatable with the ring gear $R_2$ of the second planetary gear set 13. The sun gear $S_1$ of the first planetary gear set 12 is releasably connected to both the sun gear $S_2$ of the second planetary gear set 13 and the ring gear $R_3$ of the third planetary gear set 14 through the second clutch $C_2$ and a drum 34 for the second brake $B_2$. The sun gear $S_2$ and the ring gear $R_3$ are thus constantly connected to each other. The pinion carrier 16 of the planet pinion $P_2$ is constantly connected to and rotatable with both the sun gear $S_3$ of the third planetary gear set 14 and the output shaft 11. The pinion carrier 17 of the third planetary gear set 14 is releasably connected to the third brake $B_3$.

The planetary gear sets being arranged in this manner, the following relations hold:

$$Np_1 = Nr_2,$$
$$Ns_2 = Nr_3$$

and $$Np_2 = Ns_3$$

The conditions of the clutches and brakes for the different vehicle speeds and the gear ratios attained thereby are depicted in Table IV.

TABLE IV

|  | $C_1$ | $C_2$ | $B_1$ | $B_2$ | $B_3$ | Gear Ratios | |
|---|---|---|---|---|---|---|---|
| Forward: | | | | | | | |
| 1st | − | + | − | − | + | $(1+\alpha_1)(1+\alpha_2+\alpha_2 \cdot \alpha_3)+\alpha_1 \cdot \alpha_3$ | (2.60) |
| 2nd | − | + | − | + | − | $(1+\alpha_1)(1+\alpha_2)$ | (2.10) |
| 3rd | + | − | − | + | − | $1+\alpha_2$ | (1.45) |
| 4th | + | + | − | − | − | $1$ | (1.00) |
| Rev | − | + | + | − | − | $-\dfrac{\alpha_1(1+\alpha_2)}{\alpha_2}$ | (−1.45) |

Figure 4A:
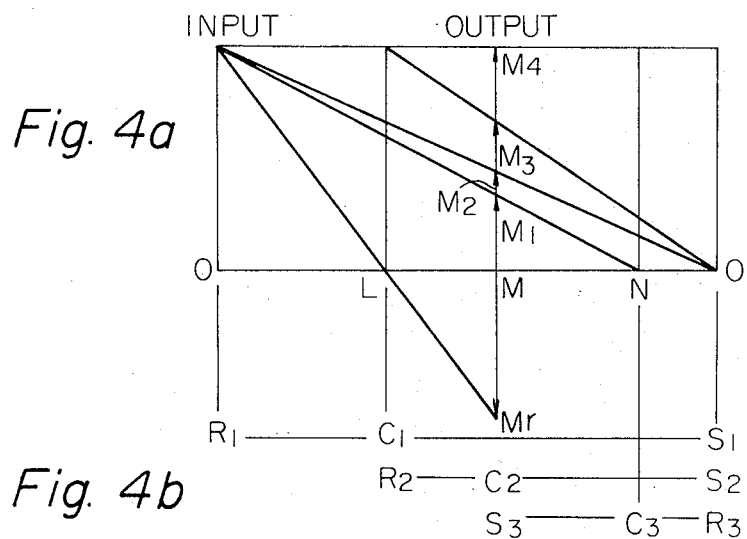

The operation of the gear train of FIG. 4 for effecting the first forward speed will be easily understood on the assumption that the gear train is driven by the output shaft 11, as in the case of the gear train of FIG. 2. The operations of the gear train for the remaining speeds will be self-explanatory if reference is made to the diagram of FIG. 4a as well as to Table IV and, hence, the discussion thereof is herein omitted.

The gear train of FIG. 4 is, similarly to the gear train of FIG. 3, advantageous in that the brake $B_1$ effecting the reverse speed is not used for the selection of any forward speed so as to provide smooth shifting of the first forward speeds.

Figure 4B:
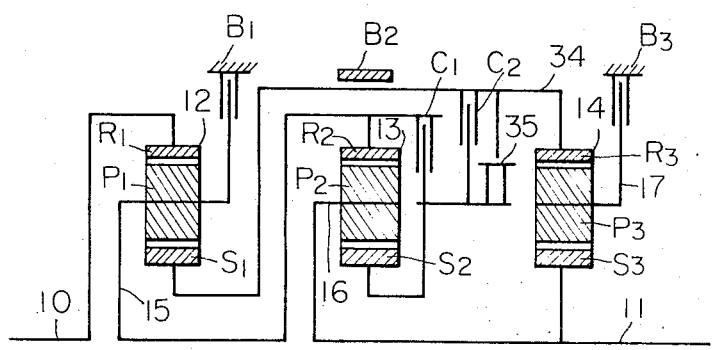

If desired, the clutch $C_1$ may be provided between the ring gear $R_2$ and sun gear $S_2$ of the second planetary gear set 13 and the second clutch $C_2$ between the brake drum 34 and sun gear $S_2$ of the second planetary gear set 13, as illustrated in FIG. 4b. With this modification made to the gear train of FIG. 4, the same gear ratios can be obtained with actuation of the same clutches and brakes as the gear train of FIG. 4.

In order to streamline the gear shifting operation from the second to the third speed in the gear train of FIG. 4b, a one-way clutch 35 may be provided in parallel with the second clutch $C_2$, if desired. When the speed is shifted from the second to the third speed, the brake $B_2$ is applied and the clutch $C_1$ coupled with the clutch $C_2$ uncoupled. If, now, the clutch $C_1$ fails to be coupled before the clutch $C_2$ is uncoupled, then the gear train will be transiently held in a neutral position. If, on the contrary, the clutch $C_2$ happens to be uncoupled after the clutch $C_1$ has been coupled, then the gear train will be locked in its entirety, preventing the wheel axles from rotating. Such problem can be eliminated through provision of the one-way clutch because, even when the clutch $C_2$ is uncoupled, the sun gear $S_2$ is held stationary by the one-way clutch 35 until the clutch $C_1$ is completely coupled and the one-way clutch 35 starts to idle away as soon as the clutch $C_1$ engages with the clutch $C_2$ uncoupled previously.

Figure 5:
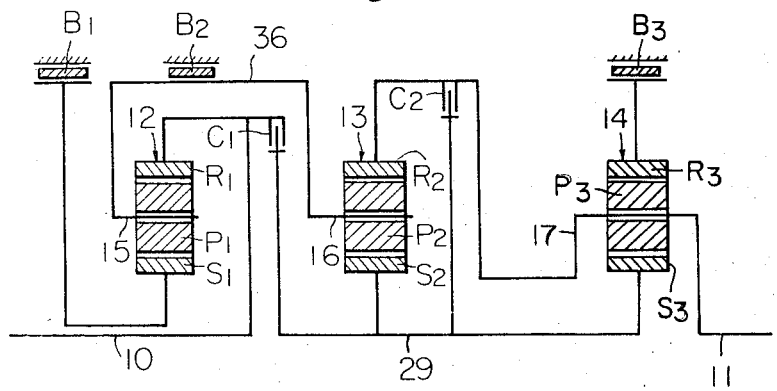

FIG. 5 illustrates still another embodiment of the invention, which is constructed essentially similarly to the embodiments already described.

The gear train shown in FIG. 5 also has three identical planetary gear sets 12, 13 and 14, respectively, which are operated by two clutches $C_1$ and $C_2$ and three brakes $B_1$, $B_2$ and $B_3$.

The input shaft 10 is connected directly to the ring gear $R_1$ of the first planetary gear set 12. The input shaft 10 and the ring gear $R_1$ are releasably connected to the sun gears $S_2$ and $S_3$ of the second and third planetary gear sets 13 and 14, respectively, through the first clutch $C_1$ and an intermediate shaft 29. The sun gears $S_2$ and $S_3$ are, in turn, releasably connected to the ring gear $R_2$ of the second planetary gear set 13 and to the pinion carrier 17 of the planet pinion $P_3$ of the third planetary gear set 14. The ring gear $R_2$ and pinion carrier 17 are thus constantly connected to each other. The sun gear $S_1$ of the first planetary gear set 12 is releasably connected to the first brake $B_1$. The pinion carrier 15 of the planet pinion $P_1$ of the first planetary gear set 12 is constantly connected to and rotatable with the pinion carrier 16 of the second planetary gear set 13 through a drum 36 for the second brake $B_2$. The ring gear $R_3$ of the third planetary gear set 14 is releasably connected to the third brake $B_3$. The pinion carrier 17 of the third planetary gear set 14 is directly connected to the output shaft 11.

Because of the constant connection between some of the rotary members, the following equations hold:

$$Np_1 = Np_2,$$
$$Nr_2 = Np_3$$

and $$Ns_2 = Ns_3$$

Figure 5A:
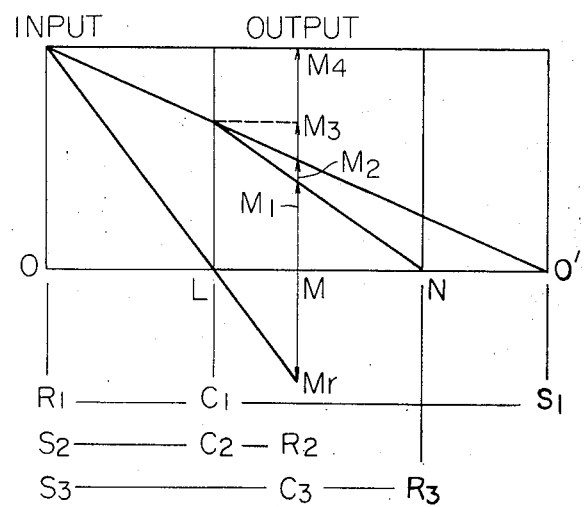

The clutches $C_1$ and $C_2$ and the brakes $B_1$, $B_2$ and $B_3$ being selectively actuated in the thus arranged gear train in a manner tabulated in Table V, the gear ratios as indicated therein can be attained for the four forward and one reverse speeds. The operation of each planetary gear set to provide such gear ratios will be understood with reference to FIG. 5a.

The gear train constructed and arranged in this manner will prove advantageous where it is desired to have available a reduced torque capacity of a clutch. Since, moreover, the output power can be delivered from the intermediate section of the gear train without significant reduction in the output torque, the gear train of FIG. 5 will find practical applications in a front-engine, front-driven or rear-engine, rear-driven motor vehicle. It may be added that, because of the fact that the brake $B_2$ is not actuated except when the reverse speed is selected, the gear ratios between the forward speeds can be changed smoothly.

TABLE V

| | $C_1$ | $C_2$ | $B_1$ | $B_2$ | $B_3$ | Gear Ratios | |
|---|---|---|---|---|---|---|---|
| Forward: | | | | | | | |
| 1st | − | − | + | − | + | $\frac{1+\alpha_1}{1+\alpha_2}\left(1+\alpha_2+\frac{\alpha_2}{\alpha_3}\right)$ | (2.45) |
| 2nd | + | − | + | − | − | $\frac{1+\alpha_1}{1-\alpha_1 \cdot \alpha_2}$ | (1.82) |
| 3rd | − | + | + | − | − | $1+\alpha_1$ | (1.45) |
| 4th | + | + | − | − | − | 1 | (1.00) |
| Rev | + | − | − | + | − | $-\frac{1}{\alpha_2}$ | (−2.22) |

Figure 6:
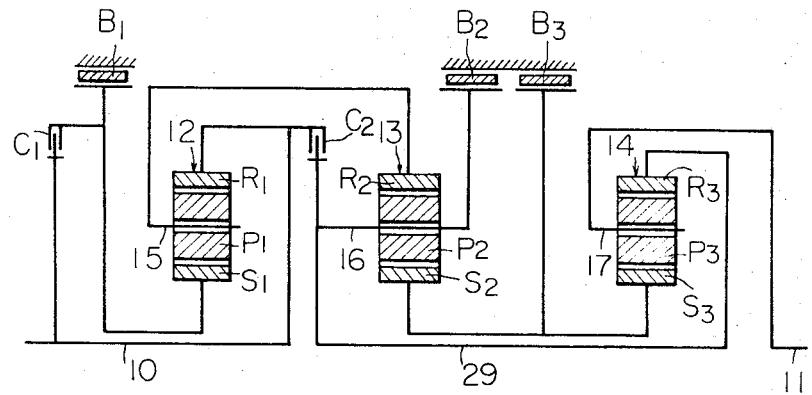

Now, still another form of the gear train arrangement according to the invention is illustrated in FIG. 6.

As shown, the gear train also has a first, second and third planetary gear sets 12, 13 and 14, respectively, which are combined with and operated by two clutches $C_1$ and $C_2$ and three brakes $B_1$, $B_2$ and $B_3$.

The ring gear $R_1$ of the first planetary gear set 12 is constantly connected to the input shaft 10. The input shaft 10 is releasably connected through the first clutch $C_1$ to the sun gear $S_1$ of the first planetary gear set 12, which sun gear $S_1$, in turn, is releasably connected with the first brake $B_1$. The pinion carrier 15 of the planet pinion $P_1$ of the first planetary gear set 12 is constantly connected to and rotatable with the ring gear $R_2$ of the second gear set 16. The input shaft 10 and the ring gear $R_1$ are also releasably connected through the second clutch $C_2$ to the pinion carrier 16 of the planet pinion $P_2$ of the second planetary gear set 13 and to the ring gear $R_3$ of the third planetary gear set 14. The pinion carrier 16 and the ring gear $R_3$ are thus constantly connected to each other. The pinion carrier 16, furthermore, is releasably connected to the second brake $B_2$. The sun gears $S_2$ and $S_3$ are constantly connected to each other through the intermediate shaft 29 and are releasably connected to the third brake $B_3$. The pinion carrier 17 of the planet pinion $P_3$ of the third planetary gear set 14 is connected to the output shaft 11.

Figure 6A:
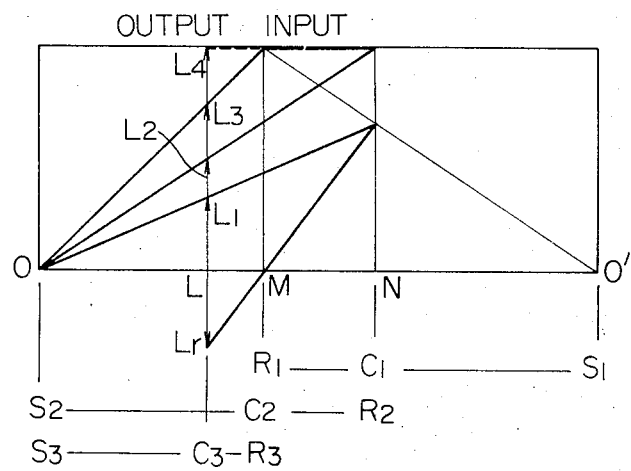

The clutches $C_1$ and $C_2$ and the brakes $B_1$, $B_2$ and $B_3$ are selectively actuated and released in a manner indicated in Table VI. The operations of the individual rotary members of the gear train thus arranged and the gear ratios attained thereby will be readily understood from the graphical representation of FIG. 6a and the mathematical expressions in Table VI.

Figure 6B:
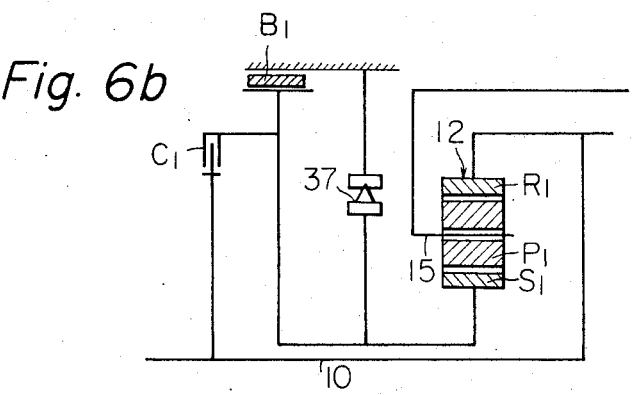

The advantages of the gear trains of FIGS. 6 and 6b are largely similar to those attainable with the gear train of FIG. 5.

Figure 7:
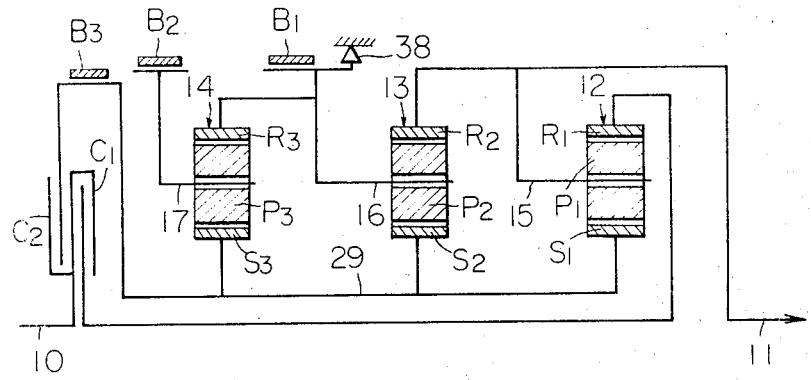

FIG. 7 illustrates still another embodiment of the invention to provide four forward and one reverse speeds with use of three planetary gear sets plus two clutches and three brakes.

As illustrated, the gear train includes first, second and third planetary gear sets 12, 13 and 14, respectively, which are operated by first and second clutches $C_1$ and $C_2$ and first, second and third brakes $B_1$, $B_2$ and $B_3$, respectively.

The input shaft 10 is releasably connected to the ring gear $R_1$ of the first planetary gear set 12 through the first clutch $C_1$ and to the sun gears $S_1$, $S_2$ and $S_3$ of the planetary gear sets 12, 13 and 14, respectively, through the second clutch $C_2$. The sun gears $S_1$, $S_2$ and $S_3$ are thus constantly connected to one another through an intermediate shaft 29. The pinion carrier 15 of the planet pinion $P_1$ of the first planetary gear set 12 is constantly connected to and rotatable with the ring gear $R_2$ of the second planetary gear set 13. The pinion carrier 16 of the planet pinion $P_2$ of the second planetary gear set 13 is constantly connected to and rotatable with the ring gear $R_3$ of the third planetary gear set 14. The planet pinion $P_2$ and ring gear $R_3$ are releasably connected to the first brake $B_1$ and the planet pinion $P_3$ is also releasably connected to the second brake $B_2$. The intermediate shaft 29 connecting the sun gears $S_1$, $S_2$ and $S_3$ together is releasably connected to the third brake $B_3$.

A one-way brake 37 is provided in combination with the second brake $B_2$ so as to prevent the pinion carrier 16 and ring gear $R_3$ from rotating in the direction opposite to the direction of rotation of the input shaft 10.

The positions of the clutches and brakes arranged for the different vehicle speeds and the gear ratios attained thereby are tabulated in Table VII. The operations of

TABLE VI

| | $C_1$ | $C_2$ | $B_1$ | $B_2$ | $B_3$ | Gear Ratios | |
|---|---|---|---|---|---|---|---|
| Forward: | | | | | | | |
| 1st | − | − | + | − | + | $(1+\alpha_1)(1+\alpha_2)(1+\alpha_3)$ | (3.05) |
| 2nd | + | − | − | − | + | $(1+\alpha_2)(1+\alpha_3)$ | (2.10) |
| 3rd | − | + | − | − | + | $1+\alpha_3$ | (1.45) |
| 4th | + | + | − | − | − | 1 | (1.00) |
| Rev | − | − | + | + | − | $-\frac{\alpha_2}{\alpha_3}(1+\alpha_1)(1+\alpha_2)$ | (−2.10) |

Figure 7A:
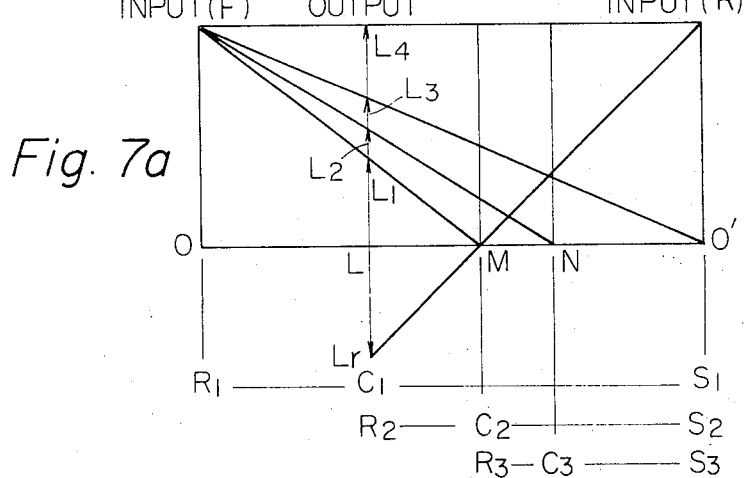

In order to streamline the gear shifting operation between the first and second speeds in the gear train of FIG. 6 a one-way clutch 37 may be used in combination with the brake $B_1$, as illustrated in FIG. 6b.

the individual rotary members will be apparent from observation of FIG. 7a.

third planetary gear sets 13 and 14, respectively, through the first clutch $C_1$. The pinion carrier 15 of the

TABLE VII

| | $C_1$ | $C_2$ | $B_1$ | $B_2$ | $B_3$ | Gear Ratios | |
|---|---|---|---|---|---|---|---|
| Forward: | | | | | | | |
| 1st | + | − | − | − | − | $\dfrac{\alpha_2(\alpha_1+1)+\alpha_1}{\alpha_2}$ | (2.45) |
| 2nd | + | − | − | + | − | $\dfrac{(\alpha_1+1)(\alpha_2+1)(\alpha_3+1)-1}{\alpha_2+\alpha_2\cdot\alpha_3+\alpha_3}$ | (1.86) |
| 3rd | + | − | − | − | + | $\alpha_1+1$ | (1.45) |
| 4th | + | + | − | − | − | 1 | (1.00) |
| Rev | − | + | + | − | − | $-\dfrac{1}{\alpha_2}$ | (−2.22) |

The one-way brake 37 acts in such a manner that, when the first forward speed is to be selected with clutch $C_1$ coupled, the pinion carrier 16, which tends to rotate in the direction opposite to the direction of rotation of the input shaft 10 because of the running resistance transferred thereto from the wheel axles, is prevented from rotating in that opposite direction by the one-way brake. Thus, when the first speed is established, $Np_2 = Ns_3 = 0$.

Figure 7B:
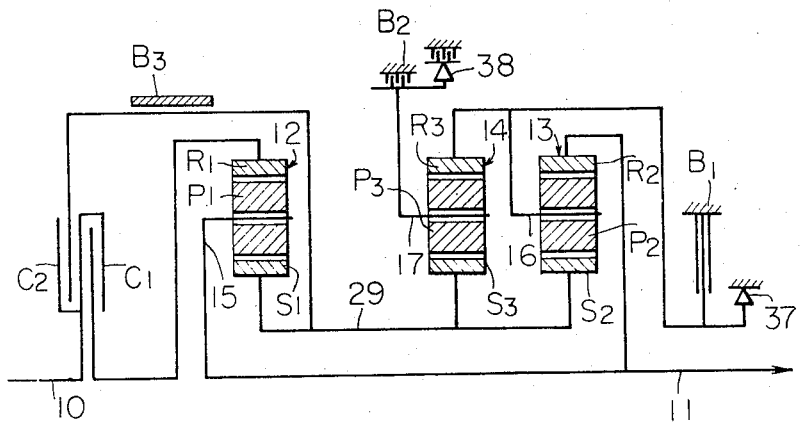

If desired, a second one-way brake 38 may be additionally provided in conjunction with the second brake $B_2$ as shown in FIG. 7b so as to prevent the pinion carrier 17 of the planet pinion $P_3$ from rotating in the direction opposite to the direction of rotation of the input shaft 10, thereby streamlining the shifting between the first and second forward speeds. The configurations of the planetary gear sets and the friction elements of the gear train shown in FIG. 7b are wholly identical with those of the gear train of FIG. 7, excepting the addition of the one-way brake 38.

Figure 8:
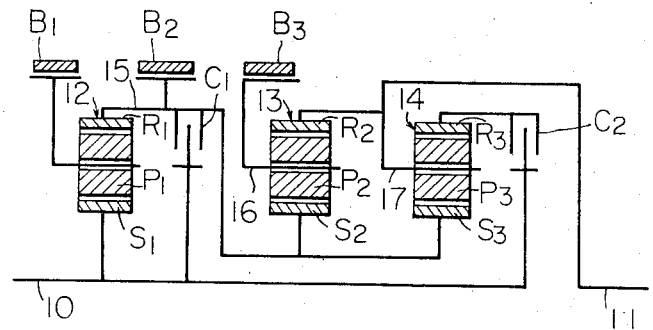

Still another form of the gear train according to the invention is illustrated in FIG. 8, which gear train also includes first, second and third planetary gear sets 12, 13 and 14, respectively, with two, first and second, clutches $C_1$ and $C_2$ and three, first, second and third, brakes $B_1$, $B_2$ and $B_3$.

The input shaft 10 is connected constantly to the sun gear $S_1$ of the planetary gear set 12 and connected releasably to the ring gear $R_1$ of the first planetary gear set 12 and the sun gears $S_2$ and $S_3$ of the second and third planetary gear sets 13 and 14, respectively, through the first clutch $C_1$. The pinion carrier 15 of the planet pinion $P_1$ of the first planetary gear set 12 is releasably connected to the first brake $B_1$, while the ring gear $R_1$ and sun gears $S_2$ and $S_3$, which are constantly connected to each other, are also releasably connected to the second brake $B_2$. The pinion carrier 16 of the planet pinion $P_2$ of the second planetary gear set 13 is releasably connected to the second brake $B_3$. The input shaft 10 is also connected releasably to the ring gear $R_3$ of the third planetary gear set 14 through the second clutch $C_2$. The pinion carrier 17 of the planet pinion $P_3$ of the third planetary gear set 14 is constantly connected to the ring gear $R_2$ of the second planetary gear set 13 and to the output shaft 11. The operations of the gear train thus constructed and the gear ratios attained thereby will be understood if reference is made to Table VIII and FIG. 8a and, therefore, discussion thereon is herein omitted.

TABLE VIII

| | $C_1$ | $C_2$ | $B_1$ | $B_2$ | $B_3$ | Gear Ratios | |
|---|---|---|---|---|---|---|---|
| Forward: | | | | | | | |
| 1st | − | + | − | − | + | $1+\dfrac{\alpha_3(1+\alpha_2)}{\alpha_2}$ | (2.45) |
| 2nd | − | + | + | − | − | $\dfrac{1+\alpha_3}{1-\alpha_1\cdot\alpha_3}$ | (1.82) |
| 3rd | − | + | − | + | − | $1+\alpha_3$ | (1.45) |
| 4th | + | + | − | − | − | 1 | (1.00) |
| Rev | + | − | − | − | + | $-\dfrac{1}{\alpha_2}$ | (−2.22) |

Figure 8A:
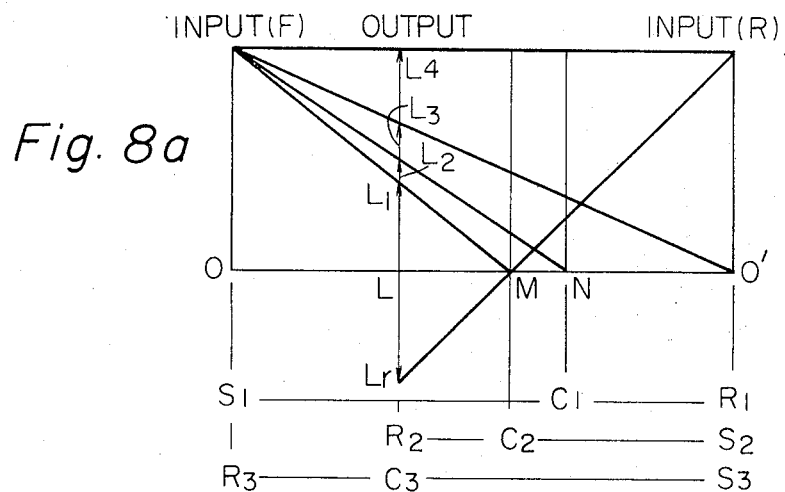
Figure 8B:
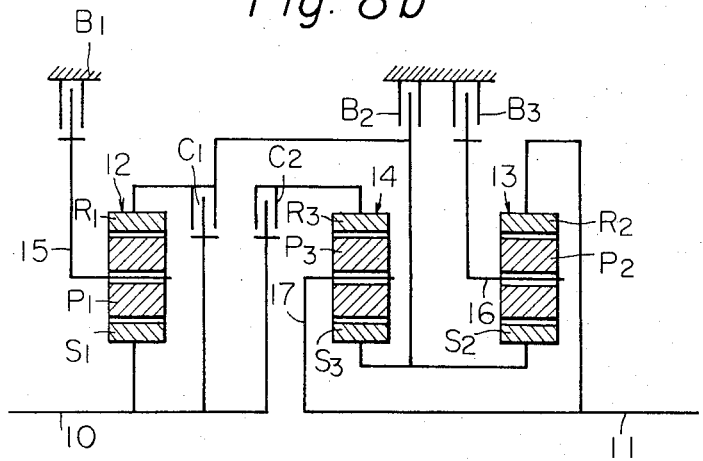

FIG. 8b illustrates a gear train which is modified in such a manner that the relative positions of the second and third planetary gear sets 13 and 14 are exchanged with each other. With all such modification, the gear train of FIG. 8a is constructed and arranged essentially similarly to the gear train of FIG. 8 and provides the same gear ratios as the latter.

Now, the gear train arrangements implementing this invention as illustrated in FIGS. 1 to 7 are constructed with two clutches and three brakes to selectively rotate the rotary members of the three planetary gear sets. It, however, is apparent that the number of the clutches and brakes to be used can be changed to provide for similar gear ratios for four forward and one reverse speeds, without major modification to the whole construction of the gear train.

FIG. 9 illustrates an example of a gear train using three clutches and two brakes to operate the three identical planetary gear sets.

The modified gear train as shown has, similarly to the embodiments previously described, first, second and third planetary gear sets 12, 13 and 14, respectively, which are combined with first, second and third clutches $C_1$, $C_2$ and $C_3$ and first and second brakes $B_1$ and $B_2$, respectively.

The input shaft 10 is releasably connected to the pinion carrier 15 of the planet pinion $P_1$ of the first planetary gear set 12 through the first clutch $C_1$, to the ring gears $R_1$ and $R_2$ of the first and second planetary gear sets 12 and 13, respectively, through the second clutch $C_2$, and to the sun gears $S_2$ and $S_3$ of the second and third planetary gear sets 13 and 14, respectively, through the third clutch $C_3$. The ring gears $R_1$ and $R_2$, and the sun gears $S_2$ and $S_3$, are thus constantly connected to each other. The sun gear $S_1$, the pinion carrier 16 of the planet pinion $P_2$ of the second planetary gear set 13, and the ring gear $R_3$ of the third planetary gear set 14 are all constantly connected to each other and to the output shaft 11. The sun gears $S_2$ and $S_3$ are releasably connected to the first brake $B_1$, while the pinion carrier 17 of the planet pinion $P_3$ of the third planetary gear set 14 is also releasably connected to the second brake $B_2$.

When, in operation, the first forward speed is to be selected, the second clutch $C_2$ is coupled and the second brake $B_2$ applied, so that the relation $Np_3 = 0$ holds in this instance. The operation of the gear train in this condition will be easily understood if it is assumed that the gear train is driven by the output shaft 11 although the input power is actually transmitted from the input shaft 10 to the ring gear $R_2$ of the second gear set 13.

If, now, the ring gear $R_3$, pinion carrier 16 and sun gear $S_1$ are driven by the output shaft 11 at a speed corresponding to a vector $MM_1$ in FIG. 9a with the pinion carrier 17 held stationary, then the sun gear $S_3$ and consequently the sun gear $S_2$ as well will rotate at a speed corresponding to a vector $O'O_1$. The pinion carrier 16 rotating at a speed $MM_1$ and the sun gear $S_2$ rotating at a speed $O'O_1$, the ring gear $R_2$ is assumed to rotate at a speed corresponding to a vector $OO_2$. The flow of the rotation of the rotary members is actually converse and, therefore, if the ring gear $R_1$ is rotated (by the input shaft 10) at a speed corresponding to the vector $OO_2$, then the pinion carrier 16 which is connected to the output shaft 11 will rotate at a speed corresponding to the vector $MM_1$ in FIG. 9a.

When the speed is shifted from the first to the second speed, the clutch $C_2$ is uncoupled and the clutch $C_1$ is coupled in lieu thereof with the brake $B_2$ kept applied. The operation of the gear train in this condition will be understood in a manner taken in the case of the first speed and it will be known that the sun gear $R_1$ and the pinion carrier 16, which deliver the output power, rotate at a speed corresponding to a vector $MM_2$ in FIG. 9a.

For shifting the speed from the second to the third speed, the brake $B_2$ is released and the brake $B_1$ applied with the clutch $C_1$ kept coupled, so that the relation $Ns_2 = Ns_3 = O$ holds. In this instance, too, the operation of the gear train will be understood on the assumption that the pinion carrier 17 and the sun gear $S_1$ are driven by the output shaft 11 at a speed corresponding to a vector $MM_3$ in FIG. 9a.

To select the fourth speed from the third speed, the brake $B_1$ is released and the third clutch $C_3$ is now coupled with the first clutch $C_1$ still kept coupled, and thus $Np_1 = Ns_2 = Ns_3$ which is equal to the speed of rotation of the input shaft 10. The planetary gear sets 12, 13 and 14 now rotate together so that the output shaft 11 receives an output power as it is supplied through the input shaft 10.

When the reverse movement of the vehicle is to be effected, the third clutch $C_3$ is coupled and the second brake $B_2$ applied. In this condition, the sun gears $S_2$ and $S_3$ are rotated by the input shaft 10 and the relation $Np_3 = O$ holds. With the pinion carrier 17 held stationary and the sun gear $S_3$ rotated at the same speed as the input shaft 10, the ring gear $R_3$ rotates at a speed corresponding to a vector $MM_r$ in FIG. 9a.

If desired, a one-way clutch 39 may be added to the second brake $B_2$ as shown in FIG. 9b so as to streamline the shifting between the second and third speeds.

The conditions of the clutches and brakes providing different vehicle speeds and the gear ratios corresponding to the speeds are tabulated in Table IX.

TABLE IX

| | $C_1$ | $C_2$ | $C_3$ | $B_1$ | $B_2$ | Gear Ratios | |
|---|---|---|---|---|---|---|---|
| Forward: | | | | | | | |
| 1st | − | + | − | − | + | $1 + \alpha_2 + \dfrac{\alpha_2}{\alpha_3}$ | (2.45) |
| 2nd | + | − | − | − | + | $1 + \dfrac{\alpha_2(1+\alpha_3)}{\alpha_3(1+\alpha_1)}$ | (2.00) |
| 3rd | + | − | − | + | − | $1 + \dfrac{\alpha_2}{1+\alpha_1}$ | (1.31) |
| 4th | + | − | + | − | − | 1 | (1.00) |
| Rev | − | − | + | − | + | $-\dfrac{1}{\alpha_3}$ | (−2.22) |

It will be noted in regard to the gear train of FIGS. 9 and 9b that, since there is no member rotated when the gear train is held in a neutral position with all the clutches uncoupled, no noise is produced when the gear ratio is being shifted.

FIG. 10 illustrates a gear train with three planetary gear sets which are operated by three clutches plus three brakes to provide four forward and one reverse speeds.

The gear train comprises first, second and third planetary gear sets 12, 13 and 14, respectively. These gear sets are combined with and operated by first, second and third clutches $C_1$, $C_2$ and $C_3$ and first, second and third brakes $B_1$, $B_2$ and $B_3$, respectively.

The input shaft 10 is connected constantly to the ring gear $R_1$ of the first planetary gear set 12 and connected releasably to the sun gear $S_1$ of the gear set 12 through the first clutch $C_1$. This sun gear $S_1$ is also releasably connected to the first brake $B_1$. The pinion carrier 15 of the planet pinion $P_1$ of the first planetary gear set 12, is connected constantly to the sun gear $S_2$ of the second planetary gear set 13 through an intermediate shaft 29. The pinion carrier 15 and consequently the sun gear $S_2$ as well are releasably connected to the ring gear $R_3$ of the third planetary gear set 14 through the second clutch $C_2$. The pinion carrier 16 of the planet pinion $P_2$ of the second planetary gear set 13 is releasably connected to the second brake $B_2$. The ring gear $R_2$ of the second planetary gear set 13 is constantly connected to the sun gear $S_3$ of the third planetary gear set 14. This sun gear $S_3$ is releasably connected to the ring gear $R_3$ through the third clutch $C_3$. The ring gear $R_2$ and the sun gear $S_3$ are also releasably connected to the third brake $B_3$.

Figure 10A:
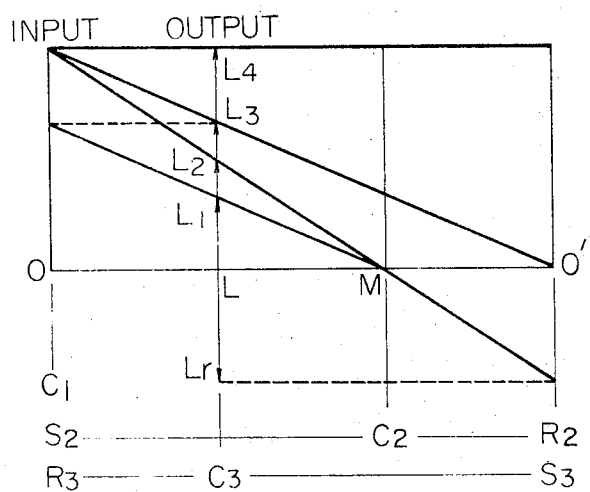

The conditions of the friction members to provide four forward and one reverse speeds by the gear train thus arranged and the gear ratios attainable thereby are tabulated in Table X. The operations of the gear train under such different conditions of the clutches and brakes will be apparent from the graphical representation of FIG. 10a.

by the one-way brake 40 just as when the brake $B_1$ is applied. If, however, the input shaft 10 receives a rotational force causing the input shaft 10 to decelerate, the one-way brake 40 is urged to rotate in the same direction as the input shaft so that the sun gear $S_1$ remains unlocked. The brake $B_1$, which is provided for the purpose of locking the sun gear $S_1$ in such conditions, is thus assisted in its locking operation by the one-way brake 40 and, for this reason, the brake $B_1$ may be of the type which has a relatively small torque capacity.

When the clutch $C_1$ is coupled, then the inner ring 40a of the one-way brake 40 rotates in the same direction as the input shaft 10. The shifting between the first and second speeds can thus be considerably facilitated with the provision of the one-way brake 40.

The one-way brake 41 functions essentially similarly to the one-way brake 40 with its inner and outer rings 41a and 41b, respectively, arranged similarly to the counterparts of the one-way brake 40. It will, however, be apparent that the one-way brake 41 is intended to provide smooth shifting between the second and third speeds in cooperation with the brake $B_2$.

FIG. 11 illustrates another example of a gear train using three planetary gear sets with three clutches and three brakes to provide four forward and one reverse vehicle speeds.

As illustrated, the gear train is made up of first, second and third planetary gear sets 12, 13 and 14, respectively, combined with first, second and third clutches $C_1$, $C_2$ and $C_3$ and first, second and third brakes $B_1$, $B_2$ and $B_3$.

The input shaft 10 is connected constantly to the ring gear $R_1$ of the first planetary gear set 12 and connected releasably to the sun gear $S_2$ of the second planetary gear set 13 through the first clutch $C_1$. The pinion car-

TABLE X

| | $C_1$ | $C_2$ | $C_3$ | $B_1$ | $B_2$ | $B_3$ | Gear Ratios | |
|---|---|---|---|---|---|---|---|---|
| Forward: | | | | | | | | |
| 1st | − | + | − | + | + | − | $\dfrac{(1+\alpha_1)(1+\alpha_3)}{1-\alpha_2\cdot\alpha_3}$ | (2.64) |
| 2nd | + | + | − | − | + | − | $\dfrac{1+\alpha_3}{1-\alpha_2\cdot\alpha_3}$ | (1.82) |
| 3rd | + | + | − | − | − | + | $1+\alpha_3$ | (1.45) |
| 4th | + | + | + | − | − | − | 1 | (1.00) |
| Rev | + | − | + | − | + | − | $-\dfrac{1}{\alpha_2}$ | (−2.22) |

Figure 10B:
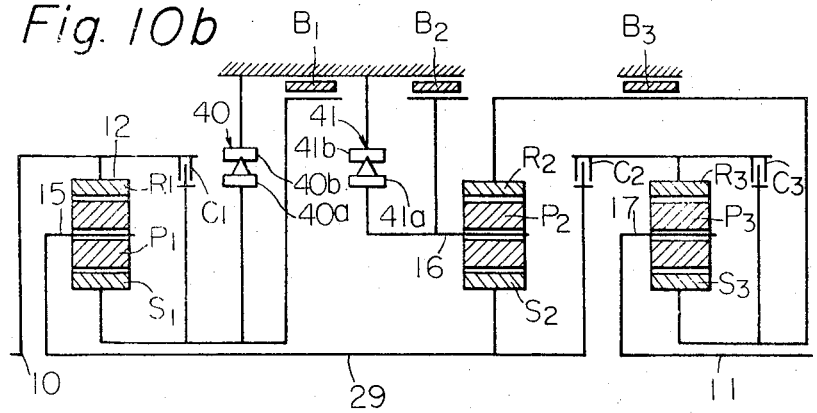

If desired, two one-way brakes 40 and 41 may be provided in parallel with the first and second brakes $B_1$ and $B_2$, respectively, as illustrated in FIG. 10b. These one-way brakes 40 and 41 are intended to prevent the sun gear $S_1$ and the pinion carrier 16 of the planet pinion $P_2$ from rotating in the direction opposite to the direction of rotation of the input shaft 10. When, more specifically, the first speed is selected and the input shaft 10 is driven by the engine (not shown) with the clutch $C_1$ uncoupled, the inner ring 40a of one-way brake 40 is urged to rotate, in relation to the outer ring 40b, in the direction opposite to the direction of rotation of the input shaft 10, with the result the sun gear $S_1$ is locked rier 15 of the planet pinion $P_1$ of the first planetary gear set 12 is connected constantly to the pinion carrier 16 of the planet pinion $P_2$ of the second planetary gear set 13. The pinion carriers 15 and 16 are releasably connected through a brake drum (not identified) to the second brake $B_2$. The sun gear $S_2$ is releasably connected to the ring gears $R_2$ and $R_3$ of the second and third planetary gear sets 13 and 14, respectively, through the second clutch $C_2$. The ring gears $R_2$ and $R_3$ are thus constantly connected to each other and are releasably connected to the sun gear $S_3$ of the third planetary gear set 14 through the third clutch $C_3$. The sun gear $S_3$ is releasably connected to the third brake $B_3$.

The pinion carrier 17 of the planet pinion $P_3$ of the third planetary gear set 14 is connected to the output shaft 11. Considering the constant connections between some of the rotary members, the relations of $Np_1 = Np_2$ and $Nr_2 = Nr_3$ hold.

Figure 11A:
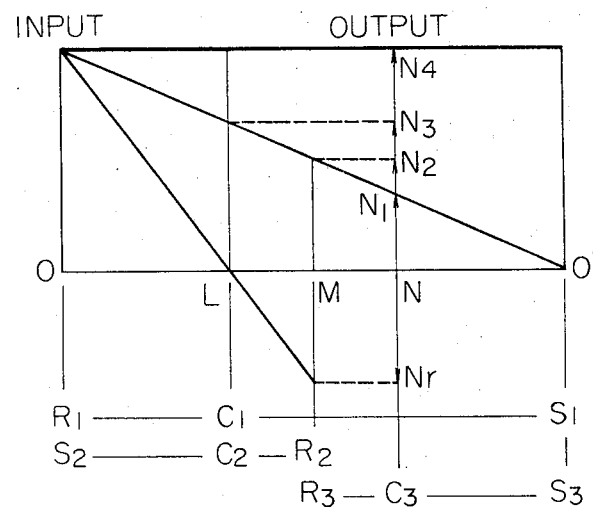

The operations of the gear train constructed in this manner for different vehicle speeds and the gear ratios attained thereby will be understood by referring to Table XI and FIG. 11a.

As previously mentioned, the first and third planetary gear sets 12a and 14, respectively, operate with the following relationships maintained:

$$(\alpha_1 + 1) \cdot Np_1 = Nr_1 + \alpha_1 \cdot Ns_1$$

and $$(\alpha_3 + 1) \cdot Np_3 = Nr_3 = \alpha_3 \cdot Ns_3,$$

where $\alpha_1$ and $\alpha_3$ are the ratios of the numbers of teeth

TABLE XI

| | $C_1$ | $C_2$ | $C_3$ | $B_1$ | $B_2$ | $B_3$ | Gear Ratios | |
|---|---|---|---|---|---|---|---|---|
| Forward: | | | | | | | | |
| 1st | + | − | − | + | − | + | $\dfrac{(1+\alpha_1)(1+\alpha_3)}{1-\alpha_1 \cdot \alpha_2}$ | (2.64) |
| 2nd | + | − | + | + | − | − | $\dfrac{1+\alpha_1}{1-\alpha_1 \cdot \alpha_2}$ | (1.82) |
| 3rd | − | + | + | + | − | − | $1+\alpha_1$ | (1.45) |
| 4th | + | + | + | − | − | − | 1 | (1.00) |
| Rev | + | − | + | − | + | − | $-\dfrac{1}{\alpha_2}$ | (−2.22) |

FIG. 12 illustrates still another form of the gear train arrangements according to the invention, in which three planetary gear sets of modified type are used in combination with three clutches (including one one-way brake) and three brakes.

As shown, the gear train comprises first, second and third planetary gear sets 12a 13a and 14, respectively, which are combined with first and second clutches $C_1$ and $C_2$, a one-way 42($C_3$) and first, second and third brakes $B_1$, $B_2$ and $B_3$, respectively.

The first planetary gear set 12a has an outer ring gear $R_1$ which is internally toothed, a planet pinion $P_1$ meshing externally with the ring gear $R_1$ and a sun gear $S_1$ meshing externally with the planet pinion $P_1$. The second planetary gear set 13a has a planet pinion $P_2$ meshing externaly with the extended portion $P_{1a}$ of the planet pinion $P_1$ and an outer ring gear $R_2$ meshing internally with the planet pinion $P_2$. The planet pinions $P_1$ and $P_2$ are carried by a common pinion carrier 15a. The third planetary gear set 14 has an outer ring gear $R_3$, a planet pinion $P_3$ carried by a pinion carrier 17 and a sun gear $S_3$, meshing with each other.

The input shaft 10 of the transmission is releasably connected to the ring gear $R_1$ of the first planetary gear set 12a through the first clutch $C_1$ and intermediate shaft 29 and to the sun gears $S_1$ and $S_3$ through the second clutch $C_2$. The sun gears $S_1$ and $S_3$ are thus constantly connected to each other. The pinion carrier 15a of the planet pinions $P_1$ and $P_2$ is constantly connected to and rotatable with the ring gear $R_3$ of the third planetary gear set 14. The ring gear $R_2$ of the second planetary gear set 13a is releasably connected to the first brake $B_1$, while the pinion carrier 17 of the planet pinion $P_3$ is releasably connected to the second brake $B_2$ through the one-way clutch 42($C_3$) which prevents the planet pinion $P_3$ from rotating in the direction opposite to the direction of rotation of the input shaft 10. The sun gears $S_1$ and $S_3$ are releasably connected to the third brake $B_3$. The carrier 15a of the planet pinions $P_1$ and $P_2$ is connected to the output shaft.

It should be borne in mind that the ring gear $R_2$ rotates in the direction opposite to the direction of rotation of the sun gear $S_1$.

of the sun gears $S_1$ and $S_3$ to the numbers of teeth of the ring gears $R_1$ and $R_3$, respectively.

If, now, the ratio of the number of teeth of the sun gear $S_1$ to the number of teeth of the ring gear $R_2$ is assumed to be $\alpha_2$, then the following equation will hold in connection with the second planetary gear set 13a:

$$(1 - \alpha_2) \cdot Np_2 = \alpha_2 \cdot Ns_1 - Nr_2,$$

because of the fact that the ring gear $R_2$ rotates in the direction opposite to the sun gear $S_1$.

In consideration of the constant connections between some of the rotary members, the following relations hold:

$$Np_1 = Np_2 = Ns_3$$

and $$Ns_1 = Ns_3$$

When, in operation, the first forward speed is to be selected, the first clutch $C_1$ is coupled. The gear train being driven by the input shaft 10, the one-way clutch 42($C_3$) operates to lock the pinion carrier 17 of the planet pinion $P_3$ and thus $Np_3 = 0$. In this instance the brake $B_3$ may be applied, if so preferred.

The gear ratio attained in this condition is, therefore, expresses as:

$$Nr_1/Np_1 = 1 + (\alpha_1/\alpha_3)$$

To shift the speed from the first to the second speed, the second brake $B_2$ is applied with the clutch $C_1$ kept coupled, in which instance the relation $Nr_2 = 0$ holds and the gear ratio is expressed as:

$$Nr_1/Np_1 = 1 + (\alpha_1/\alpha_2)$$

For shifting the speed from the second to the third speed, the brake $B_2$ is released and the brake $B_1$ applied so that $Ns_1 = Ns_3 = 0$. The gear ratio is, therefore, expressed as:

$$Nr_1/Np_1 = 1 + \alpha_1$$

When the fourth speed is to be selected from the third speed, then the brake $B_1$ is released and the second clutch $C_2$ is coupled with the first clutch kept coupled. The first planetary gear set $12a$ now rotates in its entirety at the same speed as the input shaft 10.

For effecting the reverse movement of the vehicle, the second clutch $C_2$ is coupled and the third brake $B_3$ applied, and thus $Np_3 = 0$. The gear ratio for the reverse speed is, therefore:

$$Ns_1/Np_1 = -(\alpha_1/\alpha_3)$$

Figure 12A:
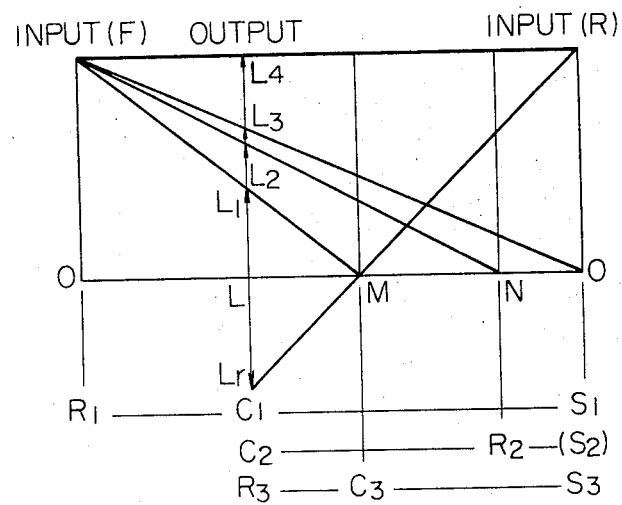

These conditions of the friction elements for the different speeds and the gear ratios obtained thereby are tabulated in Table XII in which the gear ratios in the parentheses are calculated assuming that $\alpha_1 = \alpha_3 = 0.40$ and $\alpha_2 = 0.50$. The operation of each rotary member will be understood from the graphical representation of FIG. 12a.

16 and ring gear $R_3$ from rotating in the direction opposite to the direction of rotation of the input shaft 10. The ring gear $R_2$ of the second planetary gear set 13 is releasably connected to the third brake $B_3$.

With the gear train thus arranged, the following equations hold at all times:

$$Nr_1 = Ns_2 = Ns_3$$

and $$Np_1 = Np_2 = Ns_3$$

When, in operation, the first speed is to be selected, the second clutch $C_2$ is coupled and the ring gear $R_1$ and the sun gears $S_2$ and $S_3$ are driven by the input shaft 10. In this condition, the ring gear $R_3$ tends to rotate in the direction opposite to the direction of rotation of the

TABLE XII

| | $C_1$ | $C_2$ | $C_3$ (42) | $B_1$ | $B_2$ | $B_3$ | Gear Ratios | |
|---|---|---|---|---|---|---|---|---|
| Forward: | | | | | | | | |
| 1st | + | − | + | − | − | (+) | $1 + \alpha_1 + \frac{\alpha_1}{\alpha_3}$ | (2.40) |
| 2nd | + | − | − | − | + | − | $1 + \frac{\alpha_1}{\alpha_2}$ | (1.80) |
| 3rd | + | − | − | + | − | − | $1 + \alpha_1$ | (1.40) |
| 4th | + | + | − | − | − | − | 1 | (1.00) |
| Rev | − | + | − | − | − | − | $-\frac{\alpha_1}{\alpha_3}$ | (−1.00) |

The gear train arrangement shown in FIG. 12 is advantageous where the compact construction of a transmission system is especially required, because of its reduced size in the lengthwise direction.

Now, it will be understood that the gear trains using three clutches and three brakes can be re-arranged to provide a still increased number of gear ratios, provided minor additional modifications are made thereto, an example of such arrangement being illustrated in FIG. 13.

The gear train illustrated in FIG. 13 includes first, second and third planetary gear sets 12, 13 and 14, respectively, with first, second and third clutches $C_1$, $C_2$ and $C_3$ and first, second and third brakes $B_1$, $B_2$ and $B_3$, respectively.

The input shaft 10 is releasably connected to the sun gear $S_1$ of the planetary gear set 12 through the first clutch $C_1$ and to the ring gear $R_1$, sun gear $S_2$ and sun gear $S_3$ of the first, second and third planetary gear sets 12, 13 and 14, respectively, through the second clutch $C_2$. The sun gear $S_1$ is releasably connected to the first brake $B_1$. The ring gear $R_1$ and the sun gears $S_2$ and $S_3$ are constantly connected to each other. The input shaft 10 is further releasably connected to the pinion carriers 15 and 16 of the planet pinions $P_1$ and $P_2$ of the first and second planetary gear sets 12 and 13, respectively, and the ring gear $R_3$ of the third planetary gear set 14 through the third clutch $C_3$. The pinion carriers 15 and 16 and the ring gear $R_3$ are constantly connected to each other and are releasably connected to the second brake $B_2$. This second brake is combined with a one-way brake 44 to prevent the ring gear $R_1$, pinion carrier input shaft 10 because of the running resistance transferred thereto from the wheel axles. Such tendency is, however, blocked by the action of the one-way brake 44 so that the relation of $Np_1 = Np_2 = Nr_3 = 0$ holds. The gear ratio attained is, therefore, represented by:

$$Nr_1/Np_3 = 1 + (1/\alpha_3)$$

for holding the ring gear $R_3$, the second brake $B_2$ may be applied, especially when the vehicle is to descend.

For the shifting from the first to the second speed, the third brake $B_3$ is applied with the clutch $C_2$ kept coupled, and thus:

$$Nr_2 = 0.$$

The gear ratio for the second forward speed is:

$$Nr_1/Np_3 = 1 + (1/\alpha_2 + \alpha_2 \cdot \alpha_3 + \alpha_3)$$

To shift the speed from the second to the third speed, the third brake $B_3$ is released and instead the first brake $B_1$ is applied with the clutch $C_2$ still kept coupled.

In this condition, the gear ratio is expressed as:

$$Nr_1/Np_3 = 1 + (1/1 + \alpha_3 + \alpha_1 \cdot \alpha_3),$$

because $Ns_1 = 0$.

For shifting the speed from the third to the fourth speed, the third clutch $C_3$ is coupled with all the brakes released and the clutch $C_2$ still kept coupled. In this instance, both the ring gear $R_1$ and the pinion carrier 15 are driven directly by the input shaft 10, so that the three planetary gear sets 12, 13 and 14 turn together with the input shaft 10. The gear ratio thus obtained is therefore 1 : 1.

When the speed is further shifted from the fourth to the fifth speed, the second clutch $C_2$ is uncoupled and the first brake $B_1$ applied. The gear ratio for the fifth speed is calculated as:

$$Np_1/Np_3 = (1 + \alpha_3/1 + \alpha_1 + \alpha_1 \cdot \alpha_3)$$

For the selection of the reverse speed, the first clutch $C_1$ is coupled and the second brake $B_2$ is applied, with the result that the following gear ratio is obtained:

$$Ns_1/Np_3 = -1 + \alpha_3/\alpha_1 \cdot \alpha_3$$

These conditions of the friction element to attain five forward and one reverse speeds and the gear ratios corresponding thereto are tabulated in Table XIII, in which the gear ratios in the parentheses are calculated by way of example on the assumption that $\alpha_1 = \alpha_2 = \alpha_3 = 0.45$.

serves to hold the sun gear $S_4$ stationary when applied. The planet pinion $P_4$ being carried by the pinion carrier 17 of the planet pinion $P_3$, the output shaft 11 is also connected to the planet pinion $P_4$.

To select the first speed in this modified gear train, the clutch $C_1$ is coupled and the fourth brake $B_4$ applied. With application of the brake $B_4$, the fourth sun gear $S_4$ is held stationary and the pinion carrier 17 rotates at a speed to be effected when the sun gear $S_3$ is locked. In this condition, the following relation holds:

$$Nr_1 = Ns_2 = Ns_3 = 0$$

The gear ratio thus obtained is, therefore, given by:

$$Ns_1/Nc_3 = [(\alpha_1 + 1)(\alpha_3 + 1)/\alpha_1]$$

If $\alpha_1 = \alpha_2 = \alpha_3 = 0.45$, then the gear ratio for the first forward speeds is 4.66.

TABLE XIII

| | $C_1$ | $C_2$ | $C_3$ | $B_1$ | $B_2$ | $B_3$ | Gear Ratios | |
|---|---|---|---|---|---|---|---|---|
| Forward: | | | | | | | | |
| 1st | − | + | − | − | (+) | − | $1 + \dfrac{1}{\alpha_3}$ | (3.22) |
| 2nd | − | + | − | − | − | + | $1 + \dfrac{1}{\alpha_2 + \alpha_2 \cdot \alpha_3 + \alpha_3}$ | (1.91) |
| 3rd | − | + | − | + | − | − | $1 + \dfrac{\alpha_1}{1 + \alpha_3 + \alpha_1 \cdot \alpha_3}$ | (1.27) |
| 4th | − | + | + | − | − | − | 1 | (1.00) |
| 5th | − | − | + | + | − | − | $\dfrac{1 + \alpha_3}{1 + \alpha_1 + \alpha_1 \cdot \alpha_3}$ | (0.877) |
| Rev | + | − | − | − | + | − | $-\dfrac{1 + \alpha_3}{\alpha_1 \cdot \alpha_3}$ | (−7.160) |

Figure 13A:
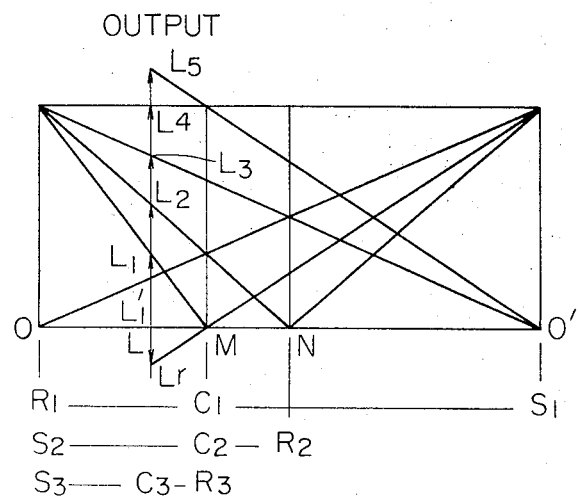

The operations of the planetary gear sets of this gear train arrangement with the friction elements operated as above will be readily understood if reference is had to FIG. 13a.

The number of gear ratios attainable with the gear train arrangement shown in FIG. 13 can be still increased with minor additional modification incorporated thereinto. FIG. 14 illustrates an example of such modified gear train arrangement, which is essentially made up of three identical and one additional planetary gear sets to provide for the combination of six forward and one reverse speeds.

The gear train illustrated in FIG. 14 is constructed and arranged essentially similarly to the gear train of FIG. 13, so far as the planetary gear sets 12, 13 and 14 and the clutches $C_1$, $C_2$ and $C_3$ and the first and third brakes $B_1$ and $B_3$ are concerned. The second brake $B_2$ and the associated one-way brake 44 are now illustrated as mounted between the pinion carriers 16 and 17 of the second and third planetary gear sets 13 and 14, respectively.

Different from the gear train of FIG. 13, an auxiliary planetary gear set 45 is provided in association with the third planetary gear set 14, as shown. The planetary gear set 45 of modified form having a planet pinion $P_4$ which is integral with the planet pinion $P_3$ and carried by the pinion carrier 17 thereof and a sun gear $S_4$ meshing externally with the planet pinion $P_4$. The sun gear $S_4$ is releasably connected to a fourth brake $B_4$ which is shown as a disc brake as an example and which The gear ratios to establish the second, third, fourth, fifth and sixth forward speeds and the reverse speeds and the operations of the gear train to attain these gear ratios correspond to the first, second, third, fourth and fifth speeds and the reverse speeds attained in the gear train of FIG. 13.

It will be noted that the gear train as shown in FIG. 14 can provide greater gear ratios than those attained in the gear train of FIG. 13.

If desired, the third clutch $C_3$ may be removed from the gear train of FIG. 14 with the pinion carrier 15 at all times disconnected from the input shaft 10 so as to provide four forward and one reverse speeds as illustrated in FIG. 15. In this instance, the operations of the gear train and the gear ratios attained thereby are entirely similar to those for effecting the first, second, third and fourth forward speeds and the reverse speed in the gear train of FIG. 14.

A further modified form of a gear train using a fourth planetary gear set of modified type is shown in FIG. 16, which gear set is adapted to provide five forward and one reverse speeds. The gear train illustrated herein is specifically a modification of the gear train illustrated in FIG. 3 and, as such, discussion of the planetary gear sets 12, 13 and 14 is omitted.

Different from the embodiment of FIG. 3, the gear train shown in FIG. 16 has an auxiliary planetary gear set 45 of modified type having a ring gear $R_4$ which is internally toothed and a planet pinion $P_4$ which is in mesh with the ring gear $R_4$. The planet pinion $P_4$ is integral with the planet pinion $P_3$ and is carried by the pinion carrier 17 which is connected to the output shaft 11. The first and second brakes $B_1$ and $Bhd 2$ are positioned between the first clutch $C_1$ and ring gear $R_1$ and between the pinion carrier 15 and ring gear $R_2$, respectively, similarly to the arrangement illustrated in FIG. 3. The third brake $B_3$ and the associated one-way brake 32 are now positioned between the pinion carrier 16 and ring gear $R_3$, as illustrated. All the planetary gear sets 12, 13 and 14 are selectively driven by the input shaft 10 which is connected to the turbine T of the torque converter 46 as is usual the case in the art.

In the gear train arrangement shown in FIG. 16, the ring gear $R_4$ of the fourth planetary gear set 45 is driven by a second input shaft $10a$ which is releasably connected to the impeller (or pump) P of the torque converter 46 through a third clutch $C_3$.

This third clutch $C_3$ is coupled with the first brake $B_1$ applied for the purpose of overdriving from the fourth speed.

The brake $B_1$ being applied, the ring gear $R_1$ of the first planetary gear set 12 is held stationary and the clutch $C_3$ being coupled with the clutches $C_1$ and $C_2$ uncoupled, the ring gear $R_4$ of the fourth planetary gear set 45 is driven by the second input shaft $10a$ which, in turn, is driven by the impeller or pump P of the torque converter 46.

The gear ratio providing the fifth speed is thus given by the equation:

$$Nr_4/Np_3 = 1 + \alpha_4 - [\alpha_4 \cdot (\alpha_1 + 1)(\alpha_2 + 1)(\alpha_3 + 1)/\alpha_1 + (\alpha_1 + 1)(\alpha_2 + \alpha_2 \cdot \alpha_3 + \alpha_3)]$$

Figure 3A:
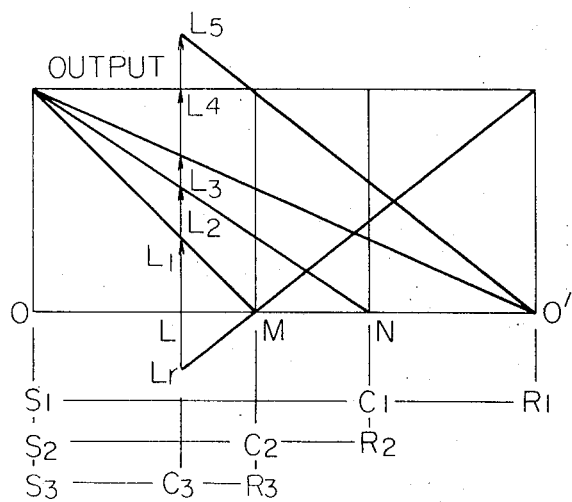

The operation of the gear train for effecting the fifth speed will be understood from observation of the line $OL_4$ in FIG. 3a. The gear ratios for the remaining speeds are exactly similar to those attained in the gear train of FIG. 3.

It will be appreciated in regard to the gear train of FIG. 16 that a portion of the output torque from the engine is carried to the second input shaft $10a$ when the clutch $C_3$ is coupled so as to add to the power transmission efficiency. To preclude occurrence of mechanical shocks in the transmission system, the second input shaft $10a$ may be fluid coupled with the first input shaft 10, wherein the second input shaft $10a$ can be connected to the turbine T of the torque converter 46 through the clutch $C_3$.

FIG. 17 illustrates another modification of the gear train of FIG. 3 to provide an overdrive from the fourth speed, the modification being essentially similar to the gear train of FIG. 16.

As illustrated, the gear train has a fourth planetary gear set $45a$ which is now interposed between the second and third planetary gear sets 13 and 14, respectively. The planetary gear set $45a$ includes a sun gear $S_4$ which is constantly connected to the sun gear $S_3$ and a planet pinion $P_4$ which is in mesh with the sun gear $S_4$. The planet pinion $p_4$ is integral with the planet pinion $P_2$ and is carried by the pinion carrier 16 of the planet pinion $P_2$. The pinion carrier 16 is connected constantly to the ring gear $R_1$ similarly to the ring gears of FIGS. 3 and 16 and releasably to the turbine T of the torque converter 46 through a second input shaft $10a$ and a third clutch $C_3$ similarly to the gear train of FIG. 16. The brake $B_1$ is positioned between the first clutch $C_1$ and the ring gear $R_1$ and the third brake $B_3$ and associated one-way brake 32 are positioned between the pinion carrier 16 and ring gear $R_3$, as shown. The second brake $B_2$ is combined with a one-way brake 47, both being positioned between the pinion carrier 15 and the ring gear $R_2$.

The operation of the thus constructed gear train for effecting the fifth speed and the gear ratio obtained thereby are similar to those in the case of the gear train of FIG. 16.

Now, it will be appreciated from the foregoing description of the various preferred embodiments of the invention that changes and modifications can be readily made to such embodiments without departing from the spirit and scope of the invention especially in the following respects:

1. The flow of power transmission through the planetary gear sets can be converted with the shaft 11 connected to the torque converter (or fluid coupling) and the shaft 10 to the differential, although the former has been designated as an output shaft and the latter as an input shaft.
2. The brakes to be utilized in the gear trains may be of any type which is presently in use for a power transmission system.
3. The clutches can be relocated suitably inasmuch as the intended rotary member or members are held stationary in a particular gear shifting operation.
4. The planetary gear sets, which have been described as essentially identical in geometry, can be modified to be sized differently from each other so as to provide practically any desired gear combination of gear ratios.
5. The gear trains can be utilized not only for the power transmission system of a motor vehicle but for any other equipment which is intended to transfer from a prime mover a mechanical power at a modified speed.
6. If any one of the planetary gear sets is removed from a gear train of the invention, the gear train will lend itself to a power transmission system of three forward and one reverse speed type.

Features and advantages of the gear train arrangements implementing the invention include:

a. Wide selection of the combinations of gear ratios.
b. Compactness of the overall gear train construction, overcoming the restriction in the accommodation of the gear train in the transmission system.
c. Adaptability to quantity production on a commercial basis because of the identical geometry of the planetary gear sets.
d. Ease of gear shifting operation; any of the forward speed can be shifted up and down merely by releasing only one of the friction elements and actuating another one of them.
e. Reduced torque capacity required of each clutch.
f. Reduced noise produced when in the gear shifting operation in the transmission system.

What is claimed is:

1. A gear train comprising:
   1. an input shaft;
   2. an output shaft;
   3. a first planetary gear set having a ring gear, a pinion carrier carrying a planet pinion meshing with the ring gear and a sun gear meshing with the planet pinion, the sun gear being connected to said output shaft;
   4. a second planetary gear set having a ring gear connected to the ring gear of said first planetary gear set, a pinion carrier carrying planet pinion meshing with the ring gear and a sun gear meshing with the planet pinion, the pinion carrier being connected to said output shaft;
5. a third planetary gear set having a ring gear connected to said output shaft, a pinion carrier carrying a planet pinion meshing with the ring gear and a sun gear meshing with the planet pinion, the sun gear being connected to the sun gear of said second planetary gear set;
6. first clutch means for engaging said input shaft with the pinion carrier of said first planetary gear set during operation of second, third and fourth forward speeds;
7. second clutch means for engaging said input shaft with the ring gears of said first and second planetary gear sets during first forward speed;
8. third clutch means for engaging said input shaft with the sun gears of said second and third planetary gear sets during operation of fourth forward speed and reverse speed;
9. first brake means for anchoring the sun gears of said second and third planetary gear sets during operation of third forward speed;
10. second brake means for anchoring the pinion carrier of said third planetary gear set during first and second forward speeds and reverse speed; and
11. one-way brake means for preventing the carrier of said third planetary gear set from rotating in a direction opposite to the rotation of said input shaft.

* * * * *